US012405598B2

(12) United States Patent
Derecichei et al.

(10) Patent No.: US 12,405,598 B2
(45) Date of Patent: Sep. 2, 2025

(54) ASSEMBLY SEQUENCE GENERATION

(71) Applicant: Divergent Technologies, Inc., Los Angeles, CA (US)

(72) Inventors: Aron Derecichei, Los Alamitos, CA (US); Lukas Czinger, Santa Monica, CA (US); Angelo Scandaliato, Los Angeles, CA (US); Dominic Francia, Redondo Beach, CA (US); Matthew Ervin Manske, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 18/651,524

(22) Filed: Apr. 30, 2024

(65) Prior Publication Data

US 2024/0288852 A1    Aug. 29, 2024

Related U.S. Application Data

(63) Continuation of application No. 17/467,945, filed on Sep. 7, 2021.

(60) Provisional application No. 63/075,738, filed on Sep. 8, 2020.

(51) Int. Cl.
*G05B 19/418* (2006.01)
*B25J 9/16* (2006.01)

(52) U.S. Cl.
CPC ...... *G05B 19/41805* (2013.01); *B25J 9/1605* (2013.01); *G05B 19/41885* (2013.01)

(58) Field of Classification Search
CPC ........ G05B 19/41805; G05B 19/41885; G05B 2219/31056; G05B 2219/32359; B25J 9/1605; Y02P 90/02
See application file for complete search history.

(56) References Cited

U.S. PATENT DOCUMENTS

| 5,203,226 A | 4/1993 | Hongou et al. |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |

(Continued)

FOREIGN PATENT DOCUMENTS

| EP | 0277423 B1 | 4/1993 |
| WO | 1996036455 A1 | 11/1996 |

(Continued)

OTHER PUBLICATIONS

US 9,202,136 B2, 12/2015, Schmidt et al. (withdrawn)

(Continued)

*Primary Examiner* — Christopher E. Everett
(74) *Attorney, Agent, or Firm* — ArentFox Schiff LLP

(57) ABSTRACT

Having a flexible robotic system layout that allows for the assembly of any structure creates a challenge in finding an optimal sequence of assembly. In some examples, the optimal sequence of assembly may provide the highest robot utilization, the shortest cycle time, the greatest assembly accuracy of the final assembly, or any combination thereof. The processing system disclosed herein may be configured to generate assembly sequences for a plurality of parts and determine an optimal assembly sequence from the generated assembly sequences by comparing the generated assembly sequences.

80 Claims, 5 Drawing Sheets

(56) References Cited

U.S. PATENT DOCUMENTS

| | | | |
|---|---|---|---|
| 6,140,602 A | 10/2000 | Costin | |
| 6,185,477 B1 * | 2/2001 | Palm | G05B 19/056 700/197 |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |
| 9,802,108 B2 | 10/2017 | Aders | |
| 9,809,977 B2 | 11/2017 | Carney et al. | |
| 9,817,922 B2 | 11/2017 | Glunz et al. | |
| 9,818,071 B2 | 11/2017 | Jung et al. | |
| 9,821,339 B2 | 11/2017 | Paschkewitz et al. | |
| 9,821,411 B2 | 11/2017 | Buller et al. | |
| 9,823,143 B2 | 11/2017 | Twelves, Jr. et al. | |
| 9,829,564 B2 | 11/2017 | Bruder et al. | |
| 9,846,933 B2 | 12/2017 | Yuksel | |
| 9,854,828 B2 | 1/2018 | Langeland | |
| 9,858,604 B2 | 1/2018 | Apsley et al. | |
| 9,862,833 B2 | 1/2018 | Hasegawa et al. | |
| 9,862,834 B2 | 1/2018 | Hasegawa et al. | |
| 9,863,885 B2 | 1/2018 | Zaretski et al. | |
| 9,870,629 B2 | 1/2018 | Cardno et al. | |

(56) References Cited

U.S. PATENT DOCUMENTS

| | | |
|---|---|---|
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |

(56) References Cited

U.S. PATENT DOCUMENTS

| | | | |
|---|---|---|---|
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 11,132,479 B1 * | 9/2021 | Tyson | G05B 19/41805 |
| 2006/0108783 A1 | 5/2006 | Ni et al. | |
| 2014/0277669 A1 | 9/2014 | Nardi et al. | |
| 2017/0113344 A1 | 4/2017 | Schönberg | |
| 2017/0341309 A1 | 11/2017 | Piepenbrock et al. | |
| 2020/0319630 A1 * | 10/2020 | Rudnitsky | G05B 19/41865 |
| 2020/0406460 A1 * | 12/2020 | Enomoto | G06Q 10/0631 |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
D.S. Hong, H.S. Cho, "A genetic-algorithm-based approach to the generation of robotic assembly sequences," Control Engineering Practice, vol. 7, Issue 2, 1999, pp. 151-159 (Year: 1999).*
Jun, Yao, et al. "Assembly process modeling for virtual assembly process planning." International journal of computer integrated manufacturing 18.6 (2005): 442-451 (Year: 2005).*
Thomas, Ulrike, and Friedrich M. Wahl. "A system for automatic planning, evaluation and execution of assembly sequences for industrial robots." Proceedings 2001 IEEE/RSJ International Conference on Intelligent Robots and Systems. vol. 3. IEEE, 2001 (Year: 2001).*
Rodriguez, Ismael, et al. "Iteratively refined feasibility checks in robotic assembly sequence planning." IEEE Robotics and Automation Letters 4.2 (2019): 1416-1423 (Year: 2019).*
Lee, Dong-Hyeong, et al. "Assembly process monitoring algorithm using force data and deformation data." Robotics and Computer-Integrated Manufacturing 56 (2019): 149-156 (Year: 2019).*
Dong et al., "A knowledge-based approach to assembly sequence planning", In International Journal of Advanced Manufacturing Technology, vol. 32, 2007, pp. 1232-1244.
Marian et al., "A genetic algorithm for the optimization of assembly sequences", Computers & Industrial Engineering, vol. 50, No. 4, Aug. 1, 2006, pp. 503-527.
Givehchi et al., "Evolutionary optimization of robotic assembly operation sequencing with collision-free paths", In Journal of Manufacturing Systems, Society of Manufacturing Engineers, vol. 30, No. 4, Aug. 5, 2011, pp. 196-203.
Noushabadi et al., "A simulation optimization approach to un-paced assembly line balancing problem-II with additional reworking issue", Modeling, Simulation and Applied Optimization (ICMSAO), In 4th International Conference of IEEE, Apr. 19, 2011, pp. 1-6.
Search Report received for European Patent Application No. 21867456. 2, Mailed on Aug. 22, 2024, 12 Pages.
Wang et al., "Assembly process planning and its future in collaborative manufacturing: a review", In International Journal of Advanced Manufacturing Technology, Springer, vol. 41, No. 1-2, Apr. 17, 2008, pp. 132-144.

* cited by examiner

ASSEMBLY SEQUENCE GENERATION

CROSS REFERENCE TO RELATED APPLICATIONS

This application is a continuation of U.S. patent application Ser. No. 17/467,945 entitled "ASSEMBLY SEQUENCE GENERATION", filed Sep. 7, 2021, which claims the benefit of U.S. Provisional Application. No. 63/075,738, entitled "ASSEMBLY SEQUENCE GENERATION" and filed on Sep. 8, 2020, which is assigned to the assignee hereof and expressly incorporated by reference herein in its entirety.

BACKGROUND

Field

The present disclosure relates generally to robotic systems and methods; and, more particularly, to one or more techniques for determining an assembly sequence for parts to be assembled in a robotic cell containing one or more robots.

INTRODUCTION

A vehicle such as an automobile, truck or aircraft is made of a large number of individual structural components joined together to form the body, frame, interior and exterior surfaces, etc. These structural components provide form to the automobile, truck, and aircraft, and respond appropriately to the many different types of forces that are generated or that result from various actions like accelerating and braking. These structural components also provide support. Structural components of varying sizes and geometries may be integrated in a vehicle, for example, to provide an interface between panels, extrusions, and/or other structures. Thus, structural components are an integral part of vehicles.

Most structural components must be joined with another part, such as another structural component, in secure, well-designed ways. Modern automobile factories rely heavily on robotic assembly of structural components. However, robotic assembly of automobile components typically requires the use of fixtures. In conventional automobile factories, for example, each part of the automobile that will be robotically assembled typically requires a unique fixture that is specific to that part. Given the large number of individual parts in an automobile that are robotically assembled, an equally large number of fixtures are typically required. In fact, a modern automobile chassis can consist of thousands of assembled parts, each part typically requiring a specially designed fixture for assembly. However, fixtures can be extremely expensive. In fact, it is not unusual for a single fixture for an automobile part to cost $300,000 to $500,000. The cost of the fixtures used in an automobile factory is a large portion of the cost of the entire factory. As a result, building a modern automobile factory requires a massive capital investment, making it necessary to build and sell hundreds of thousands of cars just to recapture the initial investment and break even, let alone make a profit.

In addition to their enormous cost, fixtures can typically only be used for the specific part for which they are designed. Therefore, if a part is changed in some way, for example, if the car model's design is updated, an entirely new fixture must be designed and built. This adds significant cost and time to the process of changing or updating car models. As a result, automobiles models are updated only infrequently, for example, every five or six years or more. In addition, the cost and inflexibility of fixtures has caused the automobile industry to look towards using common structures across different vehicle models, such as using the same subframe for a car model and an SUV model. However, this commonality can severely limit the design of each vehicle forced to share the structure. As a result, vehicles on the road begin to look more and more the same, and consumers are left with fewer distinct choices.

SUMMARY

Several aspects of robotic systems, methods, and apparatuses will be described more fully hereinafter.

In an aspect of the present disclosure, a method is presented. The method may include receiving, by a first processor, assembly parameters. The assembly parameters may include part information relating to a plurality of parts. The part information may include geometry information for each part of the plurality of parts. The method may include generating, by the first processor, a first assembly sequence for the plurality of parts based on the assembly parameters. The first assembly sequence may define a first order in which the plurality of parts is to be joined to form an assembly. The method may include generating, by the first processor, first simulation performance information for the first assembly sequence. The first simulation performance information may be associated with a robotic cell configuration that includes a plurality of robots. The first simulation performance information may include first robot utilization information and at least one of: first cycle time information corresponding to the plurality of robots or first assembly accuracy information corresponding to the assembly. The method may include selecting the first assembly sequence based on (i) the first simulation performance information corresponding to the first assembly sequence or (ii) a first score corresponding to the first assembly sequence. The first score may be based on the first simulation performance information corresponding to the first assembly sequence. The method may include generating, by the first processor, first program information and second program information for the selected first assembly sequence. The first program information may be configured to be imported into a first program and the second program information may be configured to be imported into a second program.

In an aspect of the present disclosure, a system is presented. The system may include a memory and a first processing system communicatively coupled to the memory. The first processing system may be configured to receive assembly parameters from the memory. The assembly parameters may include part information relating to a plurality of parts. The part information may include geometry information for each part of the plurality of parts. The first processing system may be configured to generate a first assembly sequence for the plurality of parts based on the assembly parameters. The first assembly sequence may define a first order in which the plurality of parts is to be joined to form an assembly. The first processing system may be configured to generate first simulation performance information for the first assembly sequence. The first simulation performance information may be associated with a robotic cell configuration that includes a plurality of robots. The first simulation performance information may include first robot utilization information and at least one of: first cycle time information corresponding to the plurality of robots or first assembly accuracy information corresponding to the assembly. The first processing system may be configured to select the first assembly sequence based on (i) the first simulation performance information corresponding to the first assembly sequence or (ii) a first score corresponding to the first assembly sequence. The first score may be based on the first simulation performance information corresponding to the first assembly sequence. The first processing system may be configured to generate first program information and second program information for the selected first assembly sequence. The first program information may be configured to be imported into a first program and the second program information may be configured to be imported into a second program.

Other aspects will become readily apparent to those skilled in the art from the following detailed description, wherein is shown and described only several exemplary embodiments by way of illustration. As will be realized by those skilled in the art, concepts described herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of the concepts described herein will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of the concepts disclosed herein and is not intended to represent the only embodiments in which the disclosure may be practiced. The terms "example" and "exemplary" used in this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

In contrast to conventional automobile manufacturing, fixtureless assembly eliminates or significantly reduces reliance on fixtures as part of a new approach to assembling vehicle structures and other multi-part structures. Such assembly operations may include joining two or more structures (e.g., additively manufactured structures such as nodes), parts, components, and the like. In joining multiple structures, at least a portion of a vehicle may be assembled. For example, joining multiple structures may result in assembly of at least a portion of a body, frame, chassis, panel, etc. of a vehicle. Advantageously, such assembly operations can be executed through controlling a set of robots to join structures without the use of fixtures. For example, a part may include a robot engagement feature as described herein that may reduce or eliminate the need for use of a fixture with respect to the part. Structures joined by the set of robots may be additively manufactured.

One or more techniques described herein may reduce development costs, reduce processing resources consumption (e.g., by selecting an assembly sequence according to one or more criteria, which may cause the processing system to stop, halt, pause, or prevent further generation of one or more assembly sequences associated with the plurality of parts for which the selected assembly sequence was generated, thereby saving processing resources resulting in increased computing efficiency), optimize assembly sequence generation (e.g., reducing the number of assembly sequences generated and simulated thereby saving processing resources resulting in increased computing efficiency), or any combination thereof.

Figure 1:
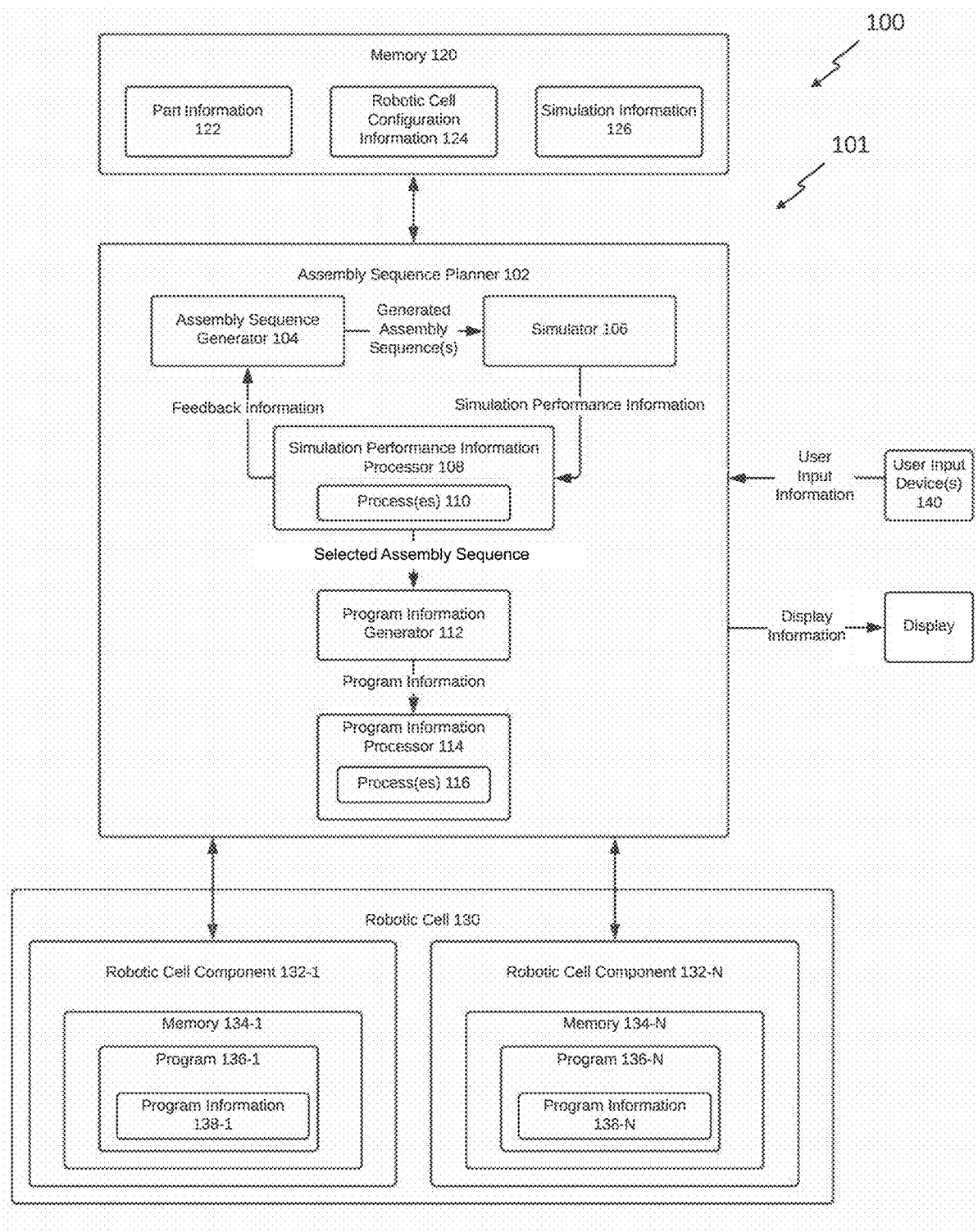
FIG. 1 illustrates an example processing system in which one or more techniques described herein may be employed.

FIG. 1 illustrates an example assembly system 100, which may be a processing system as described herein, in which one or more techniques described herein may be employed. In some examples, the assembly system may include a processing system 101 and a robotic cell 130. Processing system 101 may include an assembly sequence planner 102 and a memory 120. Assembly system 100 may generate one or more assembly sequences for a plurality of parts, select one of the assembly sequences, and assemble the parts according to a selected assembly sequence. Each assembly sequence may define a respective order in which the plurality of parts is to be joined, combined, or assembled to form an assembly. For example, a first assembly sequence may define a first order in which the plurality of parts is to be joined to form an assembly, and a second assembly sequence may define a second order in which the plurality of parts is to be joined to form an assembly. The first order may be the same as or different from the second order. While the order may be the same or different across the first and second generated assembly sequences in this example, the first and second generated assembly sequences may still be different. For example, while the order may be the same, the parts may have different starting positions in robotic cell 130. As used herein, a part may refer to any physical structure that may be combined, joined, or assembled with (i) one or more other parts to form an assembly or (ii) a sub-assembly to form an assembly. An assembly may refer to a final assembly or a sub-assembly of the final assembly. A sub-assembly may be combined, joined, or assembled with another part to form an assembly, which may be a final assembly or another sub-assembly. Whether an assembly is a sub-assembly or a final assembly, both a sub-assembly and a final assembly include a plurality of previously unassembled parts that are combined, joined, or assembled to form the sub-assembly or the final assembly, respectively. A final assembly may refer to an assembly where all parts of a plurality of parts are joined, combined, or assembled together.

In the example shown in FIG. 1, assembly system 100 includes assembly sequence planner 102, memory 120, one or more user input devices 140, and robotic cell 130. The one or more user input devices 140 may include any user input device, such as a mouse, keyboard, touchscreen, smartphone, computer, or any other input device. Assembly sequence planner 102 may be communicatively coupled with one or more robotic cell components of robotic cell 130. Assembly sequence planner 102 may be communicatively coupled to memory 120 configured to store information. The information stored on memory 120 may include assembly parameters, such as part-specific information (e.g., part information 122) and robot-specific information (e.g., robotic cell configuration information 124 and simulation information 126).

Assembly sequence planner 102 may be communicatively coupled to the one or more user input devices 140, which may generate user input information in response to interaction by a user of assembly system 100. Assembly sequence planner 102 may receive user input information from the one or more user input devices 140. Assembly sequence planner 102 may store user input information received from the one or more user input devices 140 in memory 120. Part information 122, robotic cell configuration information 124, simulation information 126, or any combination thereof may include user input information. Assembly sequence planner 102 may obtain information stored on memory 120, including, for example, part information 122, robotic cell configuration information 124, and simulation information 126.

Robotic cell 130 may include one or more robotic cell components of robotic cell 130, which are depicted as robotic cell components 132-1 through 132-N, where N is an integer greater than or equal to 1 and represents the Nth robotic cell component of robotic cell 130 in examples where robotic cell 130 includes more than one robotic cell component. A robotic cell component can be, for example, a robotic arm, an automated guided vehicle (AGV), a motorized slide for moving a robot (e.g., linear translation), a part table, a computer processor, etc. For example, the one or more components of robotic cell 130 may include one or more robots and a processing system communicatively coupled to the one or more robots. A processing system of robotic cell 130 may provide information to the one or more robots and receive information from the one or more robots. Similarly, the one or more robots of robotic cell 130 may provide information to the processing system and receive information from the processing system. The information communicated between the one or more robots and the processing system of robotic cell 130 may include, for example, robot position information, robot movement information, robot state information, PLC state information, robot control information, or robot program run information. In some examples, a processing system of robotic cell 130 may be a programmable logic controller (PLC).

Robotic cell 130 may include more than one processing system. For example, robotic cell 130 may include a first processing system corresponding to a first robotic cell component and a second processing system corresponding to a second robotic cell component. The first processing system may be a PLC and the second processing system may be a metrology system configured to measure various information regarding one or more robots of robotic cell 130. In some examples, the processing systems may provide and receive information between each other. For example, the first processing system may provide information to the second processing system and receive information from the second processing system. Similarly, the second processing system may provide information to the first processing system and receive information from the first processing system. The information communicated between processing systems of robotic cell 130 may include, for example, robot position information, robot movement information, robot state information, PLC state information, robot control information, or robot program run information. Information described as being provided, transmitted, obtained, received, or the like may be communicated in accordance with one or more communication protocols. For example, obtaining information from a memory may be accomplished by issuing an instruction compliant with a communication protocol with which the memory is configured to comply. As another example, information communicated between robotic cell components may utilize one or more communication protocols, which may depend on whether any intermediary components reside between the robotic cell component providing information and the robotic cell component destined to receive the information.

Each robotic cell component of robotic cell 130 may include a memory and a program stored on the memory that, when executed by a component of the robotic cell component, causes the cell component to perform one or more functions. For example, robotic cell component 132-1 may include a memory 134-1 with program 136-1 stored thereon, and robotic cell component 132-N may include a memory 134-N with program 136-N stored thereon. In an example where robotic cell component 132-1 is a robot and robotic cell component 132-2 (i.e., an example of a robotic cell component where N>0) is a processing system, the program 136-1 may be a robot program and the program 136-2 may be a processing system program, such as a PLC program in an example where the processing system is a PLC.

Assembly sequence planner 102 may cause program information generated by assembly sequence planner 102 to be imported into a program stored on a memory of a robotic cell component of the one or more robotic cell components of robotic cell 130. For example, assembly sequence planner 102 may generate program information 138-1 and cause program information 138-1 to be imported into the program 136-1. Similarly, assembly sequence planner 102 may generate program information 138-N and cause program information 138-1 to be imported into the program 136-N. To cause program information to be imported into a program, assembly sequence planner 102 may provide the program information to the robotic cell component that is configured to run the program with which the program information is associated. The robotic cell component may receive the program information and import the received program information into the program. In some examples, the importation of program information into a program may refer to storing the program information on a memory accessible by the robotic cell component which is configured to run the program. In other examples, the importation of program information into a program may refer to modifying the program to include the program information.

In some examples, assembly parameters, such as part information 122, may include part information that relates to the plurality of parts. Part information may include geometry information for each part of the plurality of parts. Geometry information may include three-dimensional information regarding the part. For example, geometry information may include length, width, and height information, CAD information, etc. As another example, geometry information may include three-dimensional contour information regarding the part. As another example, geometry information can include three-dimensional information that represents the part in three-dimensional space. Assembly sequence planner 102 may derive geometry information from a three-dimensional model of any part that is defined in a three-dimensional rendering program file. In such an example, the three-dimensional rendering program file may include a three-dimensional model for one or more parts of a plurality of parts. The three-dimensional rendering program file may be stored in memory 120. In some examples, the assembly sequence planner may receive the three-dimensional rendering program file from the one or more user input devices 140 and store the three-dimensional rendering program file in memory 120.

Geometry information may include joint information for each respective part of the plurality of parts. Joint information may include the number of joints that each part of the plurality of parts includes. As used herein, a joint may refer to a join or assembly location of a part to which another part or a sub-assembly may be joined. The join or assembly location may be any structural feature of the part. Joint information may include the location of each joint of each part. For example, the location of a joint may identify where on the part the joint is positioned. The location of a joint may, for example, be identified relative to an engagement feature, such as a quick connect (QC) feature. Joint information may specify, for example, a relative position and orientation of a joint location relative to an engagement feature. Joint information may identify the type of joint for each joint of each part. For example, the type of joint may be a surface, a protrusion, or any other structural feature that is combined or joined with another structural feature of a sub-assembly or a part.

Geometry information may include robot engagement feature information for each respective part of the plurality of parts. Robot engagement feature information may include the number of robot engagement features that each part of the plurality of parts includes. As used herein, a robot engagement feature may refer to any structural feature of the part that is configured to be engaged by one or more robots. For example, a robot engagement feature may refer to a structural feature that is configured to enable a robot to grab, hold, pick-up, move, or manipulate the part via engagement with the structural feature. As another example, a robot engagement feature may refer to a structural feature that enables a robot to apply adhesive to the part via the structural feature. Robot engagement feature information may include the location of each robot engagement feature of each part. For example, the location of a robot engagement feature may identify where on the part the robot engagement feature is positioned. Robot engagement feature information may identify the type of robot engagement feature for each robot engagement feature of each part. For example, the type of robot engagement feature may be a surface, a protrusion, an additively manufactured structural feature (e.g., a three-dimensional printed structural feature), a QC feature, or any other structural feature that is configured to be engaged by one or more robots.

Part information may include sub-assembly information the plurality of parts. Sub-assembly information may identify one or more sub-assemblies and the parts associated with such one or more sub-assemblies. A sub-assembly may be an assembly of a number of parts that is less than the plurality of parts. In some examples, a sub-assembly may be an assembly required to be assembled from the plurality of parts. In such examples, the sub-assembly may include a joint, a robot engagement feature, or any other structural feature that may be used during the assembly process of the plurality of parts to achieve or build the final assembly. Sub-assembly information may include geometry information, such as joint information and robot engagement feature information, for a sub-assembly.

In some examples, assembly parameters, such as robotic cell configuration information 124, may include part delivery information that relates to how the parts are delivered to the robotic cell. For example, part delivery information can include information of a plurality of part delivery structures on which one or more parts may be positioned before assembly with another part or a sub-assembly. For example, a part delivery structure may be a table on which a part may be positioned prior to being engaged, such as picked up, by a robot for assembly with another part or a sub-assembly. Part delivery information may include robotic cell location information for each respective part delivery structure relative to robotic cell 130 that identifies where, relative to robotic cell 130, each respective part delivery structure is located. For example, one or more part delivery structures may be positioned within robotic cell 130, on the perimeter of robotic cell 130, outside of robotic cell 130, or any combination thereof. Part delivery information may include a part delivery structure identifier for each respective part that identifies which respective part delivery structure each respective part is to be positioned on before assembly. Part delivery information may include part location information and/or orientation information for each respective part that identifies where each respective part is to be positioned and/or oriented on a respective part delivery structure before assembly. Part delivery information may identify the type of part delivery structure. For example, a part delivery structure may be a table, a bin, a wall, a conveyor belt, an AGV, or any other structure on which one or more parts may be located before assembly.

In some examples, assembly parameters, such as robotic cell configuration information 124, may include information that identifies the number of robotic cell components, such as the number of robots, in robotic cell 130. The robotic cell configuration information 124 may include information that identifies the location of robotic cell components, such as the locations of robots in a robotic cell layout, in robotic cell 130. The robotic cell configuration information 124 may include information that identifies the location of robotic cell components, such as the locations of robots in a robotic cell layout and locations at which any part delivery structures access the robotic cell, in robotic cell 130.

In some examples, assembly parameters, such as simulation information 126, may include information that enables simulation of robotic cell 130. For example, the simulation information 126 may include one or more robot cell simulation parameters and/or rules corresponding to robotic cell 130 that enable simulator 106 to simulate assembling a plurality of parts in robotic cell 130 in accordance with an assembly sequence generated by assembly sequence generator 104. Robotic cell simulation parameters may include, for example, robot speeds, robot power usages, robot accuracies, robot reach, part delivery structure speeds, etc.

Assembly sequence planner 102 may include assembly sequence generator 104, which may generate one or more assembly sequences for a plurality of parts. Assembly sequence generator 104 may generate the one or more assembly sequences based on part information 122. For example, the assembly sequence generator may be configured to receive part information 122, such as from memory 120.

Assembly sequence generator 104 may assign information to each part of the plurality of parts, such that an assembly sequence includes mapped information, such as a data structure, that maps each part in the assembly sequence to information, where such information may include any part information 122. For example, a plurality of parts may include a first part, a second part, and a third part. In a first example, assembly sequence generator 104 may assign part information 122 to each of the first, second, and third parts in a first assembly sequence. In this first example, the first assembly sequence may define the order of assembly as the first part is to be assembled with the second part and then the third part is to be assembled with the second part, which is already assembled with the first part. The generated first assembly sequence may include first part delivery information assigned to the first part, second part delivery information assigned to the second part, and third part delivery information assigned to the third part. However, in a second example including the same plurality of parts as the first example, assembly sequence generator 104 can assign part information 122 to each of the first, second, and third parts in a second assembly sequence. In this second example, the second assembly sequence may define the order of assembly as the second part is to be assembled with the third part and then the first part is to be assembled with the second part, which is already assembled with the third part. The generated second assembly sequence may include the first part delivery information assigned to the first part, the second part delivery information assigned to the second part, and the third part delivery information assigned to the third part. In these two examples, the first, second, and third part delivery information may, for example, be a first, second, and third part delivery structure identifier, respectively.

As another example, an assembly sequence generated by assembly sequence generator 104 may include part delivery location information assigned to each part of the plurality of parts within the assembly sequence. For example, in generating the one or more assembly sequences for the plurality of parts based on the assembly parameters, assembly sequence generator 104 may assign respective part delivery location information to each respective part of the plurality of parts for each respective assembly sequence of the one or more assembly sequences.

In some examples, assembly sequence generator 104 may generate one or more assembly sequences by using a computer program(s). For example, the assembly sequence generator may generate one or more assembly sequences by executing computer code on the assembly parameters. As an example, one or more assembly sequences may be generated by applying a first computer code to the assembly parameters, and one or more assembly sequences may be generated by applying a second computer code to the assembly parameters. The first and second computer codes may be different. For example, the first computer code may use a genetic method and the second computer code may use a mixed integer linear program (MILP). Other example methods could include satisfiability methods (such as satisfiability modulo theories (SMT)). As another example, the first and second computer codes may use different genetic methods. In another example, the first and second computer codes can be any combination of the methods above. In various embodiments, these methods may be used in simulator 106 and/or simulation performance information processor as well.

Example Genetic Method: Genetic algorithms (GAs) are an optimization methodology that may be employed or otherwise performed by assembly sequence planner 102, such as by assembly sequence generator 104. GAs are a subset of evolutionary algorithms. In GA terminology, a population is the group of candidates (chromosomes) at any given iteration, a chromosome is a set of design variables (genes) which make up the search space, and a gene is a design variable which is attempted to be optimized. A generation is each new population in this iterative process. The design variables are encoded into a suitable format for the GA operators, such as a flat one-dimensional array of genes or a two-dimensional array of genes. The population of chromosomes evolves via mating of elite (best scored) parents via crossover and mutation operators. The GA performance may be enhanced by utilizing different types of mutation and crossover operators to define various search characteristics.

In order to reduce the time it takes to find a local optima and/or global optima candidate solutions, meta-heuristic knowledge may be built into the GA to reduce the search space. The part delivery structures and parts encoded in the assignments may not be independent. The search space may be reduced by exploiting some problem specific knowledge for positioning parts on the tables.

Part Delivery Structure Adjacency: In some examples, part delivery structures may be considered adjacent if they are within one or two shared handlers reach from each other. This may be a reasonable definition since parts from any two part delivery structures must be joined by at least two handlers. A handler may refer to a robot.

Sub-assembly Tree: In some examples, sub-assemblies group parts that should enter the system on adjacent part delivery structures. The leaf sub-assemblies may be particularly useful since they contain the parts.

Part Joints: May define which parts are connected to each other. This information may be partially redundant with the sub-assembly tree since all parts in a sub-assembly may be connected.

How this information is used in the GA operators is described below.

Example Chromosome Constructor: New chromosomes may be first initialized with empty part delivery structures. Then each leaf sub-assembly may be randomly selected and its parts may be randomly placed on random part delivery structures. Part delivery structure adjacency may be utilized by placing the next part on a part delivery structure adjacent to the previously placed part. This procedure may result in grouping sub-assemblies into compact part delivery structure neighborhoods in the cell.

Example Mutation Operators: Mutation operators may select a chromosome from the current generation, and may alter the chromosome by rearranging some of its genes. Mutation operators may add new chromosomes to the population. Mutation operators may leave the original chromosome unchanged and create a new one with the alterations.

Example Two Part Swap: Two random parts may be selected from a chromosome and swap positions.

Example Two Part Delivery Structure Swap: Two random part delivery structures may be selected from a chromosome and swap parts.

Example All Part Delivery Structure Swap: All part delivery structures from a chromosome may be randomly selected and swap parts.

Example Crossover (Mating) Operators: Crossover operators may select two chromosomes (parents) from the current generation, and may create new chromosomes (children or offspring) by interchanging genes between the parents.

Example Multipoint (Random Parts): The same set of random parts may be selected and relocated cross the parent chromosomes.

Example Multipoint (Non-homologous Parts): Homologous genes may be parts that appear in the same position (part delivery structure and part index) in both parents. This crossover operator may find all non-homologous genes between two parents, and may relocate them to create two new children chromosomes. Since early generations (e.g., early generations of assembly sequences) may be more diverse and therefore have more non-homologous genes, this operator may broaden the search range by relocating a larger set of genes. In later generations (e.g., later generations of assembly sequences), as chromosomes start to converge, the number of non-homologous genes reduce, and this operator then helps speed up convergence. The non-homologous genes may be randomly placed at the end of tables.

Example Horizontal Split with Repair: A random position (part delivery structure and part index) may be selected, and two parent chromosomes may be split and crossed over by swapping part delivery structures above and below the position. This may create two children chromosomes. Since the crossover can result in missing or duplicate parts, a repair step may be performed to fix invalid chromosomes.

Example Vertical Split with Repair: A random position (part delivery structure and part index) may be selected, and two parent chromosomes may be split and crossed over by swapping parts from the left and right of the position. This may create two children chromosomes. Since the crossover can result in missing or duplicate parts, a repair step may be performed to fix invalid chromosomes.

Referring back to FIG. 1, for each assembly simulation of a generated assembly sequence, simulator 106 may generate simulation performance information. The simulator performance information may be associated with the configuration of robotic cell 130, which may be defined by the robotic cell configuration information 124. The simulator performance information may include robot resource allocation, robot utilization information, task scheduling and cycle time information, assembly accuracy information, etc., corresponding to the simulated sequence and performance of the one or more robots in robotic cell 130 during the simulated assembly of the plurality of parts in accordance with a generated assembly sequence. In some examples, robot utilization information may identify how many of the robots among the plurality of robots of the simulated robotic cell are utilized by the generated assembly sequence. For example, the number of robots may be the number robots used during the simulation performed by simulator 106 for a particular assembly sequence. In some examples, cycle time information may identify a cycle time corresponding to the robotic cell simulated for the generated assembly sequence. For example, the cycle time may be the cycle time of the simulation performed by simulator 106 for a particular assembly sequence. In some examples, the simulator performance information may include assembly accuracy information. For example, simulator 106 can determine (e.g., predict) a dimensional accuracy of the final assembly for a particular assembly sequence. Dimensional accuracy may include, for example, predicted length and/or rotation measurements of the assembly that may be different than the desired lengths and/or rotations. For example, simulator 106 may determine that, if the assembly is assembled according to a particular assembly sequence, the length of assembly in a particular direction (e.g., an x-direction) may be up to 1 mm too long or short. Similarly, simulator 106 may determine that one end of the assembly may be rotated up to 2 degrees from the desired orientation.

Simulator 106 may provide the simulated assembly sequences (i.e., assembly sequences that have undergone simulation by simulator 106) and simulator performance information generated for each simulated assembly sequence to the simulation performance information processor 108. The simulation performance information processor 108 may perform one or more processes 110 on the simulation performance information generated by simulator 106. For example, the one or more processes 110 may include storing simulation performance information in memory 120. As another example, the one or more processes 110 may include enabling user interaction with simulation performance information. To enable user interaction with simulation performance information, the simulation performance information processor 108 may cause simulation performance information to be displayed on a display of assembly system 100. As another example, the one or more processes 110 may include determining whether a simulated assembly sequence is valid or should be discarded. In such an example, the simulation performance information processor 108 may make such a determination based on the simulation performance information corresponding to a simulated assembly sequence. For example, the simulation performance information processor 108 may compare simulation performance information with one or more validity criteria. In some examples, in the event of at least one validity criterion of the one or more validity criteria not being satisfied, the simulation performance information processor 108 may discard the assembly sequence.

The validity criteria may include checking the simulation performance information for simulation complete information, which may indicate either that the assembly sequence can be completed by robotic cell 130 or cannot be completed by robotic cell 130. If the simulation performance information processor 108 determines that the assembly sequence with which the simulation performance information is associated cannot be completed by robotic cell 130, then the simulation performance information processor 108 may discard the assembly sequence. If the simulation performance information processor 108 determines that the assembly sequence with which the simulation performance information is associated can be completed by robotic cell 130, then the simulation performance information processor 108 may accept the assembly sequence.

The validity criteria may include a threshold number of robots criterion, such as a maximum number or a minimum number of robots used during the simulation to assemble the parts in accordance with the assembly sequence. In this example, the simulation performance information processor 108 may discard or accept the assembly sequence based on whether this validity criterion is satisfied based on the robot utilization information of the simulation performance information. For example, the simulation performance information processor 108 may compare the threshold number of robots criterion to robot utilization information to determine whether an assembly sequence should be accepted or discarded. An assembly sequence may be discarded if the threshold number of robots criterion is not satisfied, and may be accepted if the threshold number of robots criterion is satisfied.

The validity criteria may include a cycle time criterion. The cycle time criterion may be a minimum cycle time criterion or a maximum cycle time criterion. In this example, the simulation performance information processor 108 may discard or accept the assembly sequence based on whether this validity criterion is satisfied based on the cycle time information of the simulation performance information. For example, the simulation performance information processor 108 may compare the cycle time criterion to cycle time information to determine whether an assembly sequence should be accepted or discarded. An assembly sequence may be discarded or accepted based on whether the simulation cycle time for the simulated assembly sequence satisfies or does not satisfy the cycle time criterion. In some examples, the cycle time criterion may include the cycle time of the simulation performance information being less than the cycle time criterion, less than or equal to the cycle time criterion, equal to the cycle time criterion, greater than the cycle time criterion, or greater than or equal to the cycle time criterion.

The validity criteria may include an assembly accuracy criterion. The assembly accuracy criterion may be, for example, a minimum assembly accuracy criterion, such as a maximum acceptable dimensional deviation from nominal dimensions of the assembly. In various embodiments, the minimum assembly accuracy criterion may be on the order of millimeters or microns. In this example, the simulation performance information processor 108 may discard or accept the assembly sequence based on whether this validity criterion is satisfied based on the assembly accuracy information of the simulation performance information. For example, the simulation performance information processor 108 may compare the assembly accuracy criterion to assembly accuracy information to determine whether an assembly sequence should be accepted or discarded. An assembly sequence may be discarded or accepted based on whether the simulation assembly accuracy for the simulated assembly sequence satisfies or does not satisfy the assembly accuracy criterion. In some examples, the assembly accuracy criterion may include the assembly accuracy of the simulation performance information being less than the assembly accuracy criterion, less than or equal to the assembly accuracy criterion, equal to the assembly accuracy criterion, greater than the assembly accuracy criterion, or greater than or equal to the assembly accuracy criterion.

Example Objective Function For Generation of Candidate Fitness Score: Each candidate solution may be run through the sequence simulator. Based on the results of the simulation, an objective function may be used to calculate a scalar valued fitness score. Information generated by the simulator may be input into the objective function to generate the score. This score may be used to rank the candidates. The objective function may be formulated to indicate optimal performance when minimized. The number of parts on a particular robot may indicate assembly sequence completeness. The number of closed joints may indicate the progress of the assembly sequence simulation. The average robot utilization may indicate full usage of the robotic cell with minimal idle time.

In the event the simulation performance information processor 108 determines to discard an assembly sequence, the simulation performance information processor 108 may provide feedback information to assembly sequence generator 104. The feedback information may include the discarded assembly sequence and the simulation performance information associated therewith. In the event the simulation performance information processor 108 determines that an assembly sequence is valid, the simulation performance information processor 108 may provide feedback information to assembly sequence generator 104. The feedback information may include the accepted assembly sequence and the simulation performance information associated therewith. Assembly sequence generator 104 may adjust generation of subsequent assembly sequences based on feedback information received from the simulation performance information processor 108. For example, based on feedback information, assembly sequence generator 104 may adjust, modify, or change one or more methods applied to the assembly parameters, such as part information 122, robotic cell configuration information 124, and simulation information 126. As another example, based on feedback information, assembly sequence generator 104 may prevent inclusion of any sequence in any subsequently generated assembly sequences, such as a sequence associated with a sub-assembly, that satisfies one or more criterion, such as the sequence being unable to be completed during simulation of a previously generated assembly sequence, or the sequence took too long to complete during simulation of a previously generated assembly sequence. As another example, based on feedback information, assembly sequence generator 104 may target inclusion in any subsequently generated assembly sequences of any sequence, such as a sequence associated with a sub-assembly, that was determined by the simulation performance information processor 108 as having an associated cycle time and/or assembly accuracy that satisfied an optimized criterion.

As another example, the one or more processes 110 may include determining a score for assembly sequences based on simulation performance information. For example, the simulation performance information processor 108 may receive a first assembly sequence and first simulation performance information associated therewith and a second assembly and second simulation performance information associated therewith from simulator 106. The simulation performance information processor 108 may determine a first score for the first assembly sequence based on the first simulation performance information, and a second score for the second assembly sequence based on the second simulation performance information.

As another example, the one or more processes 110 may include selecting an assembly sequence based on selection information. Selection information may include at least one selection criterion relative to one or more scores. The one or more scores may include a comparison score or one or more generated scores respectively corresponding to different assembly sequences. The comparison score may be a numerical value. The comparison score may be a score different from any score generated or otherwise determined by the simulation performance information processor 108. The comparison score may be a default value or a user input value, either of which may constitute a threshold value. The comparison score may be user input information stored in memory 120, which a user may have input into assembly system 100 by interacting with the one or more user input devices 140. A score generated for an assembly sequence based on simulation performance information may be a numerical value.

In some examples, the simulation performance information processor 108 may compare a score of an assembly sequence with the comparison score. The simulation performance information processor 108 may select the assembly sequence based on the comparison of the score of the assembly sequence to the comparison score. For example, the simulation performance information processor 108 may determine whether a score of an assembly sequence satisfies selection information, such as at least one selection criterion relative to the comparison score. In some examples, the at least one selection criterion may include the score of an assembly sequence being less than the comparison score, less than or equal to the comparison score, equal to the comparison score, greater than the comparison score, or greater than or equal to the comparison score. The simulation performance information processor 108 may select the assembly sequence based on the determination that the score of the assembly sequence satisfies the selection information, such as at least one selection criterion relative to the comparison score.

The simulation performance information processor 108 may generate a respective score for each respective assembly sequence among a plurality of assembly sequences. In some examples, the simulation performance information processor 108 may compare the scores generated for the plurality of assembly sequences to determine which score satisfies selection information. In some examples, the selection information may include at least one selection criterion that includes the highest score or the lowest score. The simulation performance information processor 108 may select the assembly sequence based on the determination that the score of the assembly sequence satisfies the selection information, such as the assembly sequence that has the highest score or the lowest score among the scores generated for the plurality of assembly sequences.

As another example, the one or more processes 110 may include selecting an assembly sequence based on the simulation performance information corresponding to the assembly sequence. In such an example, the simulation performance information processor 108 may compare the simulation performance information corresponding to various assembly sequences to selection information, which may include at least one selection criterion. The simulation performance information processor 108 may select the assembly sequence based on the comparison of the simulation performance information corresponding to the assembly sequence with the selection information. In some examples, the at least one selection criterion may include a selection cycle time and/or assembly accuracy. In this example, the simulation performance information processor 108 may select an assembly sequence if the cycle time and/or assembly accuracy set forth in the cycle time and/or assembly accuracy information corresponding to the assembly sequence satisfies the selection cycle time and/or assembly accuracy, such as being less than the selection cycle time and/or being greater than the selection assembly accuracy.

The program information generator 112 may generate program information for one or more assembly sequences. The one or more assembly sequences may include one or more selected assembly sequences. The program information may include program information for one or more programs. For example, the program information generator 112 may generate program information for a processing system program for a processing system of robotic cell 130 and respective program information for each respective robot utilized by simulator 106 during simulation of the assembly sequence for which the program information is being generated. For example, program information may include off-line programs (OLPs) for robots in the cell, process task dependencies for the programable logic controller (PLC) of the robots, etc.

The program information processor 114 may perform one or more processes 116 on the program information generated by the program information generator 112. For example, the one or more processes 116 may include storing program information in memory 120. As another example, the one or more processes 116 may include enabling user interaction with program information, such as enabling the user to modify program information. Modification of program information may include adding information to generated program information. To enable user interaction with program information, the program information processor 114 may cause program information to be displayed on a display of assembly system 100. As another example, the one or more processes 116 may include causing program information to be imported into a program stored on a memory of a robotic cell component of the one or more robotic cell components of robotic cell 130. To cause program information to be imported into a program, the program information processor 114 may provide the program information to the robotic cell component that is configured to run the program with which the program information is associated. The robotic cell component of robotic cell 130 may receive the program information and import the received program information into the program.

Figure 2:
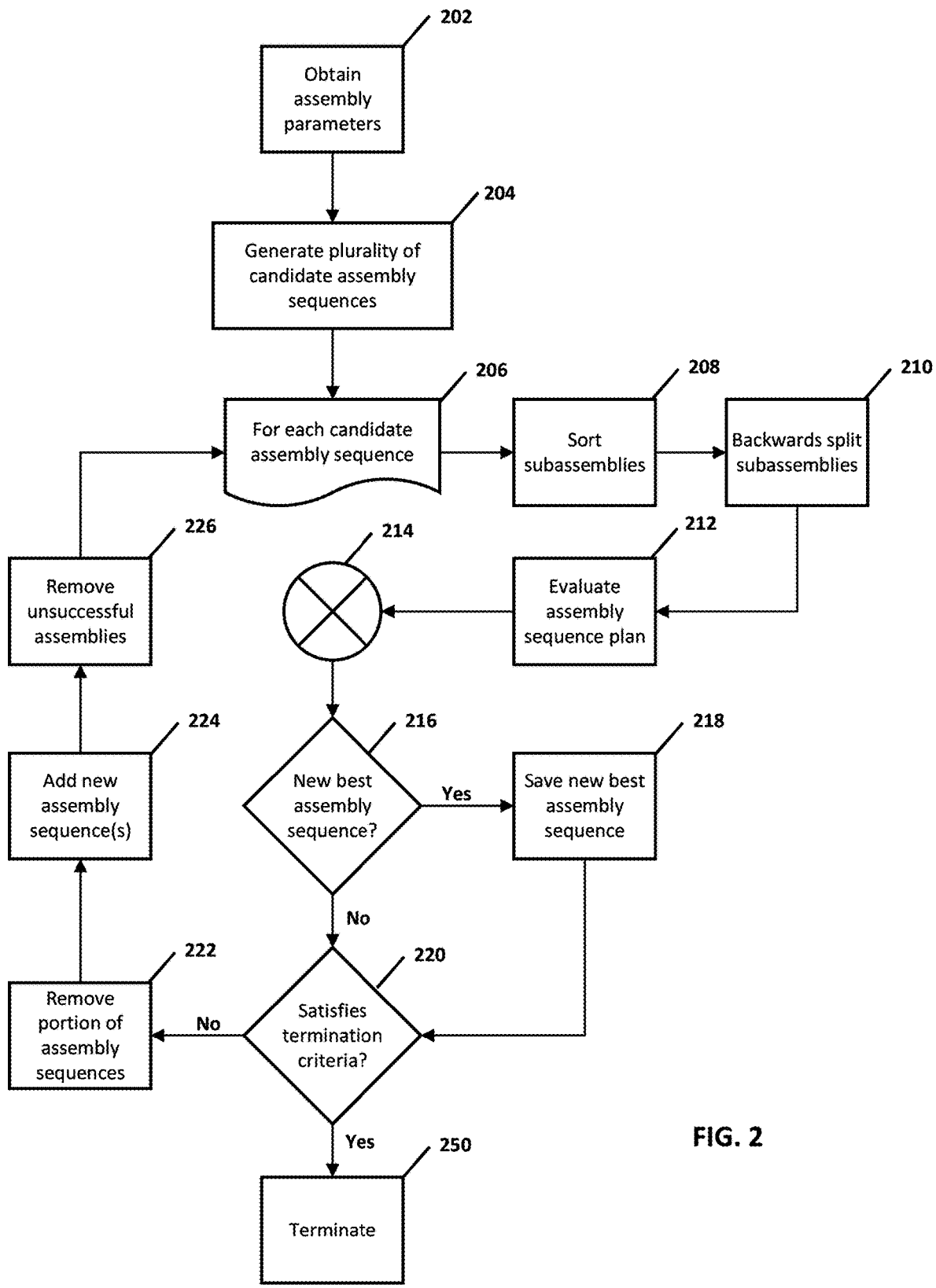
FIG. 2 illustrates an example algorithm that may be performed by an assembly sequence generator, simulator, and simulation performance information processor in accordance with one or more techniques of this disclosure.

FIG. 2 illustrates an example of a method that assembly sequence generator 104, simulator 106, and simulation performance information processor 108 may use to generate one or more assembly sequences. Referring to FIG. 2, at block 202, assembly sequence generator 104 may obtain assembly parameters. In some examples, the assembly parameters may be received from memory 120. Some examples of assembly parameters can include part-specific information, such as part geometry in CAD or finite element mesh format, a partial or complete metadata file containing part-to-part joint information related to install information (e.g., the location of the joint on the part, the translation vector used to move the part towards its counterpart part during joining), bonding information relating to the bond used to join (e.g., cure time of an adhesive used to bond, welding locations), part handler information (e.g., gripper engagement feature information, compatible end effector geometry), part metrology landmark information (e.g., metrology feature locations), part machining surface information, part mass and center-of-gravity information, subassembly groupings (e.g., preferred subassembly orders), and/or part material information (e.g., part material composition (e.g., aluminum, plastic, composite)). Assembly parameters may include robot-specific information, such as robot model information (e.g., robot specifications including robot task timing parameters, robotic arm reach, robot connectivity information), robotic cell information (e.g., cell layout, metrology system information, AGV path information, part table specifications, robot end effector specifications and locations, PLC information). Assembly parameters may include sequence generation parameters, such as termination criteria, search policies, meta-heuristics, etc. At block 204, assembly sequence generator 104 may generate a plurality of candidate assembly sequences that defines an initial search set of candidate assembly sequences that enumerates a portion of a search space. At block 206, assembly sequence generator 104 may perform the processes described with respect to blocks 208, 210, 212, 214, 216, 218, 220, 222, 224, 226, and 250 for each candidate assembly sequence in the initial search set.

Figure 3A:
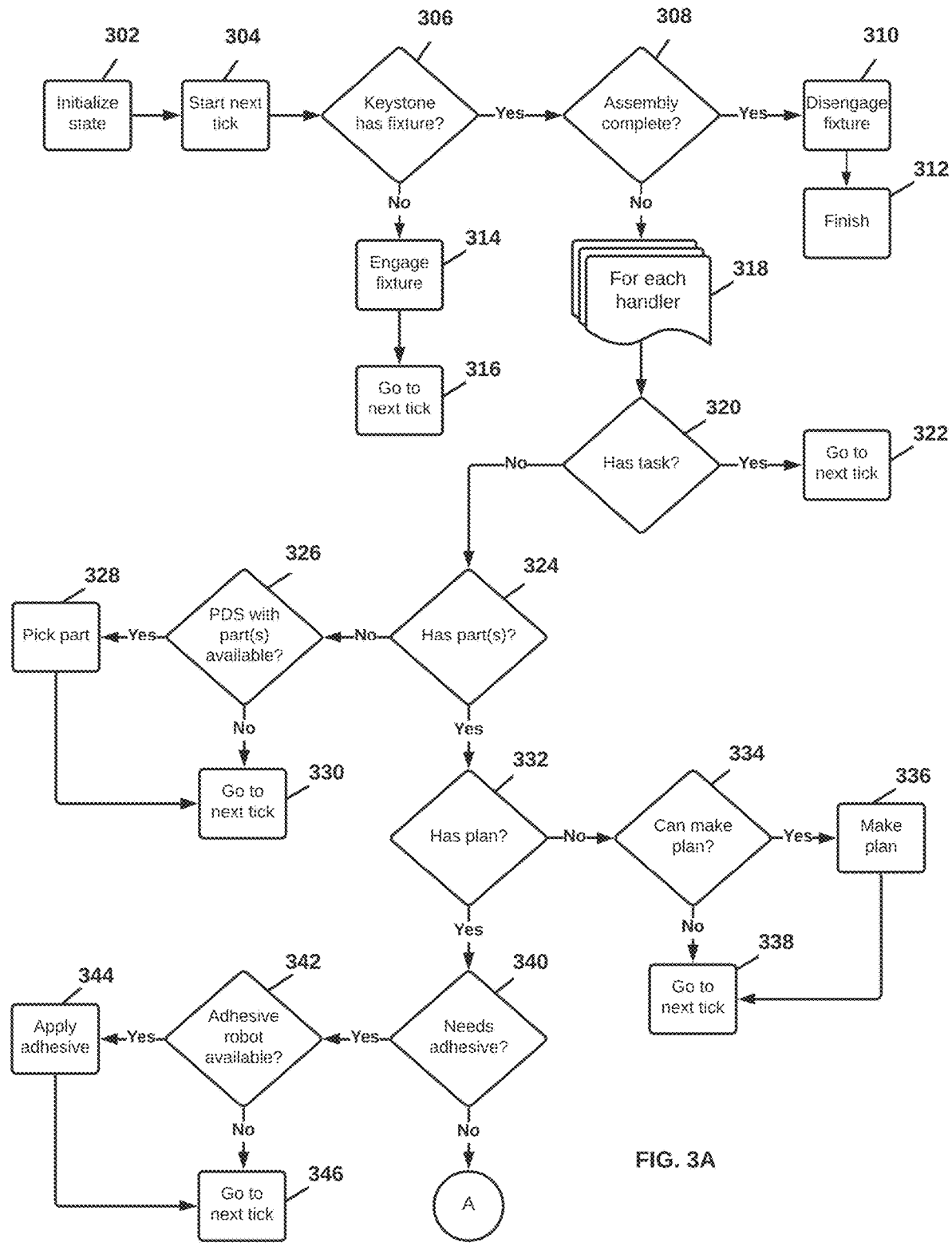
FIGS. 3A-B illustrate an example algorithm in accordance with one or more techniques of this disclosure.
Figure 3B:
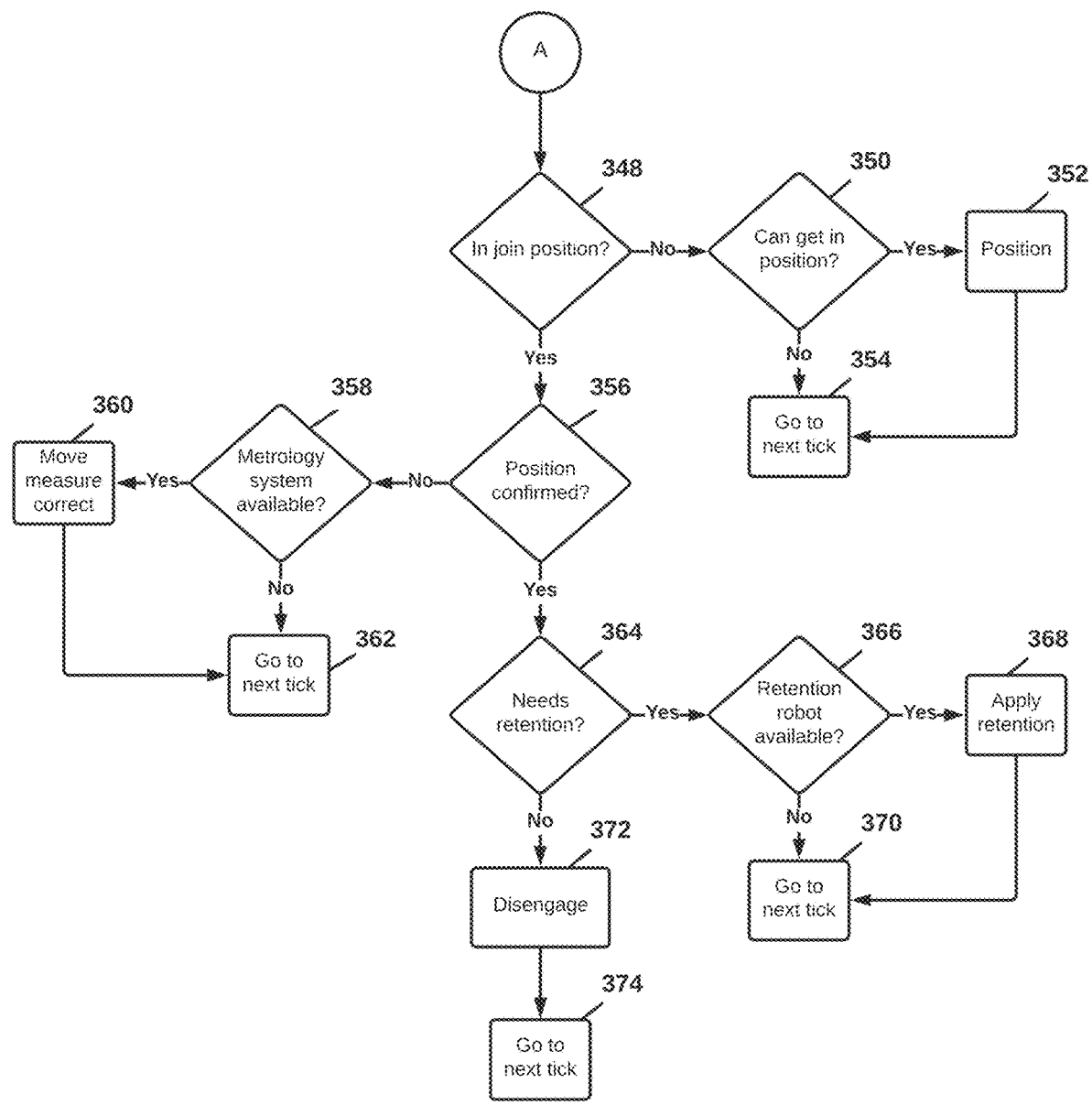

At block 208, assembly sequence generator 104 may sort sub-assemblies for the particular assembly sequence, e.g., determining possible subassembly scenarios and sorting by inherent order based on assembly join geometry. For example, various subassembly combinations may be sorted based on the metadata defining the parts' joints. For example, assembly sequence generator 104 may randomly sort remaining level 1 sub-assemblies (e.g., a group of parts that are associated with a particular robot in the cell) in reverse order starting from the sub-assembly on the automated guided vehicle (AGV). At block 210, assembly sequence generator 104 may backwards split the sub-assemblies for the particular assembly sequence. For example, assembly sequence generator 104 may backwards split (that is, simulate disassembly) the first level 1 sub-assembly over the robot graph onto the part delivery structures. At block 212, each candidate assembly sequence may be processed by simulator 106 to perform a simulation of each candidate to determine simulation performance information, such as resource allocation and task schedule information. For example, FIGS. 3A-B show an example method performed by simulator 106. The simulation performance information can be used be the remaining process as shown in the remainder of FIG. 2. At block 214, assembly sequence generator 104 may allows 208, 210, and 212 to be performed on all candidate assembly sequences from 206.

Blocks 216, 218, and 220 may be performed by the simulation performance information processor 108. At block 216, simulation performance information processor 108 may receive the simulation performance information of each candidate assembly sequence from block 214 and may determine, based on the information received from block 214, whether the particular assembly sequence is a new best assembly sequence, for example, by comparing the assembly sequence's simulation performance information with the validity criteria as described above with respect to FIG. 1. At block 218, simulation performance information processor 108 may save (e.g., store) the particular assembly sequence in memory 120 if it is determined at block 216 that the particular assembly sequence is the new best assembly sequence. From block 218, simulation performance information processor 108 may proceed to block 220. Simulation performance information processor 108 may proceed to block 220 if it is determined at block 216 that the particular assembly sequence is not the new best assembly sequence. At block 220, simulation performance information processor 108 may determine whether termination criteria is satisfied. Termination criteria may include, for example, exhaustion of all possible candidate assembly sequences, a time limit, a number of candidates limit, convergence criteria (e.g., an indication of no further improvement), etc. Simulation performance information processor 108 may proceed to block 250 if it is determined that the termination criteria is satisfied at block 220. At block 250 the simulation performance information processor 108 may output the best candidate assembly sequence, which was saved in block 218, as the selected assembly sequence and terminate the process. If the termination criteria is not satisfied at block 220, simulation performance information processor 108 may provide feedback to assembly sequence generator 104 as shown in blocks 222, 224, and 226.

At block 222, assembly sequence generator 104 may remove a portion of assembly sequences from the initial search set of candidate assembly sequences. In some examples, removal of a portion of assembly sequences may include removal of a portion of worst performing assembly sequences. At block 224, after removal of an assembly sequence at block 222, assembly sequence generator 104 may add one or more new assembly sequences to the plurality of assembly sequences that are to be analyzed in the method illustrated in FIG. 2. At block 226, assembly sequence generator 104 may remove unsuccessful sub-assemblies. In some examples, removal of unsuccessful sub-assemblies may include removing assembly sequences that fail to achieve successful assembly of the plurality of parts or fail to satisfy one or more different criterion. From block 226, assembly sequence generator 104 may proceed to block 206 and loop through the blocks described above in the same manner but for a different respective assembly sequence of the plurality of assembly sequences.

Example Architecture: An assembly sequence simulation may utilize an initial assignment of parts to part delivery structures, such as tables, for robots to pick-up and assemble through the robotic cell. As the number of parts increases, for a given number of tables, the number of permutations increase exponentially. This search space may consist of all infeasible and feasible solutions. In some examples, heuristic-based optimization may be implemented by assembly system 100 by generating many possible candidates (e.g., multiple assembly sequences for a particular plurality of parts) in the search space, evaluating each candidate's fitness score based on an objective function, and then using the candidates with the best score to generate new candidates. A candidate or candidate solution may refer to an assembly sequence generated for a plurality of parts, such as an assembly sequence generated by assembly sequence generator 104. Iterating in this fashion may drive the candidates to optimal solutions in the search space. Care may be taken to avoid premature convergence to local optima to find global optima. Therefore, any advances in performance may be amplified when running the optimization routine, which may be performed by assembly sequence planner 102. This includes, for example, sequence simulation execution time, dispatch and retrieval from storage, generation of new candidates in the search space, evaluation of fitness score for each candidate, or any combination thereof.

FIGS. 3A-B illustrate an example of a simulation method that simulator 106 may use to perform a simulation on a candidate assembly sequence based on the robotic cell configuration information 124 and simulation information 126. A keystone may refer to a robotic cell component of robotic cell 130, such as a robot. In some examples, keystone may refer to a centrally located robot relative to other robots in robotic cell 130, or a robot that interacts with or within reach of a plurality of other robots in robotic cell 130. In some embodiments, a keystone robot may be a robot that executes the final step in the assembly and passes the final assembly out of the robotic cell. In some embodiments, a keystone robot may utilize a fixture to hold the final assembly. While FIGS. 3A-B show the engagement and disengagement of a fixture, other examples may include engagement and disengagement of a robot engagement feature in addition to or in lieu of a fixture (that is, in some embodiments a fixture and/or a keystone robot might not be used). In this regard, blocks 306, 314, 316, and 310 may be optional. Handlers may refer to robots different from the keystone robot.

Referring to FIGS. 3A-B, at block 302, simulator 106 may initialize state. For example, an initial state may be robots of the cell in their initial poses, and the parts are not engaged by the robots. At block 304, simulator 106 may start the next tick. A tick refers to a time step in the simulation. In some embodiments, a tick may equal 1 second. In other embodiments, a tick may be a value less than 1 second. In alternate embodiments, a tick may be a value greater than 1 second. At block 306, simulator 106 may determine whether a keystone of the robotic cell in the simulation is engaged with a fixture. Simulator 106 may proceed to block 314 if it is determined that the keystone does not have a fixture. At block 314, simulator 106 may cause the keystone to engage a fixture as part of the simulation. From block 314, simulator 106 may proceed to block 316 where simulator 106 may go the next tick. Simulator 106 may proceed to block 308 if it is determined that the keystone has a fixture. At block 308, simulator 106 may determine whether the simulated assembly is complete. If the assembly held by the keystone is not complete, then the assembly held by the keystone may be referred to as a sub-assembly. Simulator 106 may to proceed to block 318 if it is determined that the simulated assembly is not complete. Simulator 106 may proceed to block 310 if it is determined that the simulated assembly is complete. At block 310, simulator 106 may cause the keystone to disengage the fixture as part of the simulation. From block 310, simulator 106 may proceed to block 312 where simulator 106 may finish or otherwise end the simulation. During the example simulation method illustrated in FIGS. 3A-B, simulator 106 may generate simulation performance information.

At block 318, simulator 106 may perform the illustrated processes for each handler corresponding to the simulated robotic cell configuration. At block 320, simulator 106 may determine whether the particular handler has a particular task, e.g., moving to engage a part, engaging a part, moving a part, disengaging a part, holding a part for adhesive application, joining parts, or other task. Simulator 106 may proceed to block 322 if it is determined that the particular handler has a task. At block 322, simulator 106 may go to the next tick. Simulator 106 may proceed to block 324 if it is determined that the particular handler does not have a task. At block 324, simulator 106 may determine if the particular handler is engaging one or more parts. Simulator 106 may proceed to block 326 if it is determined that the particular handler is not engaged with one or more parts. Simulator 106 may proceed to block 332 if it is determined that the particular handler is engaged with one or more parts.

At block 326, simulator 106 may determine whether a part delivery structure (PDS) has one or more parts available for engagement by the particular handler. A PDS may include, e.g., a parts table on which parts are positioned for picking by robots, an AGV that delivers parts to robots, etc. In some examples, the part delivery structure may be assigned or associated with the particular handler. In some embodiments, at block 326 simulator 106 may determine if the handler needs to equip an end effector to engage (e.g., pick) the part, in which case the simulator may cause the handler to equip the appropriate end effector. Simulator 106 may proceed to block 328 if it is determined that the part delivery structure has one or more parts available. At block 328, simulator 106 may cause the particular handler to engage (e.g., pick-up) one or more parts as part of the simulation. Simulator 106 may proceed to block 330 from block 328. Simulator 106 may proceed to block 330 if it is determined that the part delivery structure does not have one or more parts available for engagement by the particular handler. At block 330, simulator 106 may go to the next tick.

At block 332, simulator 106 may determine whether the particular handler has a plan. For example, if the handler is engaging a part, the plan may include a coordination plan between the handler and another handler to join parts. Simulator 106 may proceed to block 340 if it is determined that the particular handler has a plan. Simulator 106 may proceed to block 334 if it is determined that the particular handler does not have a plan. At block 334, simulator 106 may determine whether the particular can make a plan. Simulator 106 may proceed block 336 if it is determined that the particular handler can make a plan. At block 336, simulator 106 may make (e.g., set) a plan. Simulator 106 may proceed to block 338 from block 336. At block 338, simulator 106 may go to the next tick.

At block 340, simulator 106 may determine whether the sub-assembly and/or the one or more parts engaged by the particular handler needs adhesive for assembly thereof. Simulator 106 may proceed to block 342 if it is determined that adhesive is needed. Simulator 106 may proceed to block 348 if it is determined that adhesive is not needed. At block 342, simulator 106 may determine whether an adhesive robot is available. In some examples, an adhesive robot may be a robot configured to apply adhesive to the one or more parts engaged by the particular handler and/or the sub-assembly. In some embodiments, at block 342 simulator 106 may determine if an adhesive robot needs to equip an adhesive applicator to apply adhesive, in which case the simulator may cause the adhesive robot to equip the appropriate applicator. Simulator 106 may proceed to block 344 if it is determined that an adhesive robot is available with the appropriate adhesive applicator. At block 344, simulator 106 may cause the adhesive robot to apply adhesive in the simulation, and then simulator 106 may proceed to block 346. Simulator 106 may proceed block 346 if it is determined that an adhesive robot is not available at block 342. At block 346, simulator 106 may go to the next tick.

At block 348, simulator 106 may determine whether the particular handler is in a join position. In some examples, being in a join position may refer to the position in which the particular handler is configured to perform a joining process, which may involve remaining stationary or moving to join the one or more parts engaged by the particular handler with the sub-assembly. Simulator 106 may proceed to block 350 if it is determined that the particular handler is not in a join position. Simulator 106 may proceed to block 356 if it is determined that the particular handler is in a join position. At block 350, simulator 106 may determine whether the particular handler can get in a join position. Simulator 106 may proceed to block 352 if it is determined that the particular can get into a join position. At block 352, simulator 106 may cause the particular handler to move to or otherwise enter the join position in the simulation. Simulator 106 may proceed to block 354 from block 352. Simulator 106 may proceed block 354 if it is determined that the particular handler cannot get into a join position. At block 354, simulator 106 may go to the next tick.

At block 356, simulator 106 may determine whether the position is confirmed. Simulator 106 may proceed to block 358 if it is determined that the position is not confirmed. Simulator 106 may proceed to block 364 if it is determined that the position is confirmed. At block 358, simulator 106 may determine whether a metrology system is available for the particular handler. Simulator 106 may proceed to block 360 if it is determined that a metrology system is available. At block 360, simulator 106 may simulate a measurement by the metrology system in the simulation and to correct the position of the particular handler based on the simulated measurement. Simulator 106 may proceed to block 362 from block 360. Simulator 106 may proceed block 362 if it is determined that a metrology system is unavailable. At block 362, simulator 106 may go to the next tick.

At block 364, simulator 106 may determine whether the sub-assembly and/or the one or more parts engaged by the particular handler needs retention, e.g., if the handler needs to hold the part still while a retaining adhesive is quick-cured. Simulator 106 may proceed to block 366 if it is determined that the sub-assembly and/or the one or more parts engaged by the particular handler needs retention for assembling the one or more parts engaged by the particular handler in accordance with the plan determined in block 336. Simulator 106 may proceed to block 372 if it is determined that the sub-assembly and/or the one or more parts engaged by the particular handler does not need retention for assembling the one or more parts engaged by the particular handler in accordance with the plan determined in block 336. At block 366, simulator 106 may determine whether a retention robot is available. A retention robot may include, for example, a robot that applies a quick-cure adhesive and/or cures the quick-cure adhesive to retain the joined parts. In some examples, a retention robot may be a robot configured to apply retention to the one or more parts engaged by the particular handler and/or the sub-assembly. Simulator 106 may proceed to block 368 if it is determined that a retention robot is available. In some embodiments, at block 366 simulator 106 may determine if a retention robot needs to equip an end effector to execute retention of the parts, in which case the simulator may cause the retention robot to equip the appropriate end effector. At block 368, simulator 106 may cause the retention robot to apply retention in the simulation, and then simulator 106 may proceed to block 370. Simulator 106 may proceed to block 370 if it is determined that a retention robot is not available at block 366. At block 370, simulator 106 may go to the next tick.

At block 372, simulator 106 may cause the particular handler to disengage the one or more engaged parts after the one or more parts are joined with the subassembly engaged by the keystone or other handler in of the simulation in accordance with the plan determined in block 336. Simulator 106 may proceed to block 374 from block 372. At block 374, simulator 106 may go to the next tick.

Figure 4:
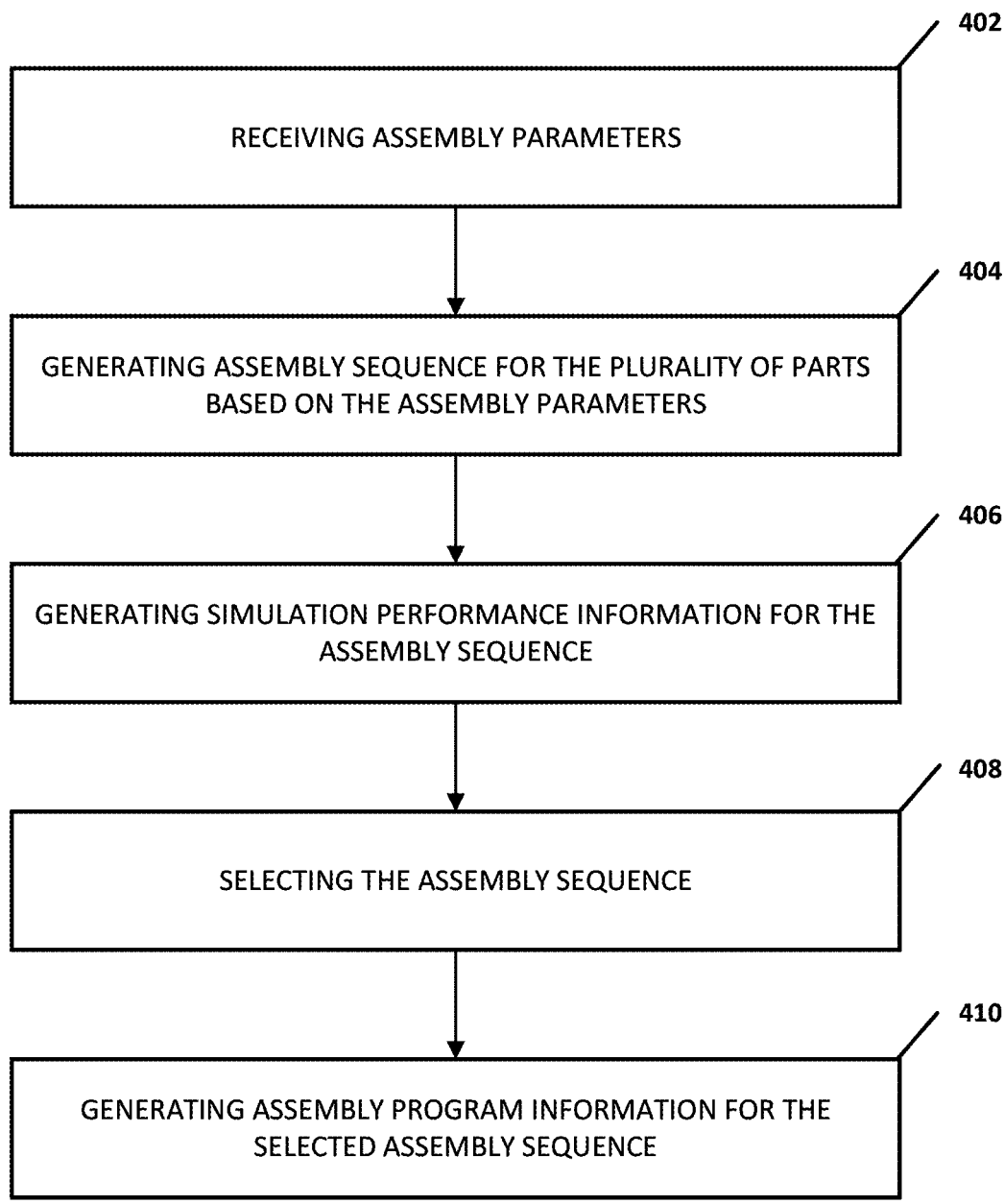
FIG. 4 illustrates an example method in accordance with the techniques disclosed herein.

FIG. 4 illustrates an example method in accordance with the techniques disclosed herein. The method may be performed by a processing system as described herein, such as assembly system 100.

At block 402, the method may include receiving assembly parameters. As described above, the assembly parameters may include part-specific information relating to a plurality of parts and robot-specific information relating to multiple robots, e.g., part handlers, AGVs, adhesive applicators, retention robots, etc. At block 404, the method may include generating a first assembly sequence for the plurality of parts based on the assembly parameters. The first assembly sequence may include a first order in which the plurality of parts is to be joined to form an assembly. The first assembly sequence may also include, for example, resource allocation and task schedule information (e.g., robot 1 is scheduled to pick part X from part table T at time t1, robot 2 is scheduled to move its arm from location A to location B at time t2, etc.). At block 406, the method may include generating first simulation performance information for the first assembly sequence. The first simulation performance information may be associated with a robotic cell configuration that includes a plurality of robots. The first simulation performance information may include first robot utilization information and at least one of: first cycle time information corresponding to the plurality of robots or first assembly accuracy information corresponding to the assembly. At block 408, the method may include selecting the first assembly sequence. Selecting the first assembly sequence may be based on the first simulation performance information (which may include, for example, a first score of the first assembly sequence) corresponding to the first assembly sequence. At block 410, the method may include generating assembly program information for the selected first assembly sequence, which characterizes an assembly of the selected first assembly sequence in the corresponding robotic cell. In various embodiments, the assembly program information may include, for example, data that can be imported into a robotic cell program, such as PLC of the robotic cell, to control the robots in the cell to assemble the parts according to the selected first assembly sequence. In various embodiments, the assembly program information may include, for example, executable code downloadable to a controller of the robotic cell to control the robots in the cell to assemble the parts according to the selected first assembly sequence. Generally speaking, the assembly program information may include any data, code, etc., that can be used by the robotic cell to assemble the parts according to the selected first assembly sequence.

Example 1. An example method comprising: receiving, by a first processor, assembly parameters, wherein the assembly parameters includes part information relating to a plurality of parts, wherein the part information includes geometry information for each part of the plurality of parts; generating, by the first processor, a first assembly sequence for the plurality of parts based on the assembly parameters, wherein the first assembly sequence defines a first order in which the plurality of parts is to be joined to form an assembly; generating, by the first processor, first simulation performance information for the first assembly sequence, wherein the first simulation performance information is associated with a robotic cell configuration that includes a plurality of robots, and wherein the first simulation performance information includes first robot utilization information and first cycle time information corresponding to the plurality of robots and/or a first assembly accuracy information corresponding to an assembly; selecting the first assembly sequence based on (i) the first simulation performance information corresponding to the first assembly sequence or (ii) a first score corresponding to the first assembly sequence, wherein the first score is based on the first simulation performance information corresponding to the first assembly sequence; and generating, by the first processor, first program information and second program information for the selected first assembly sequence, wherein the first program information is configured to be imported into a first program and the second program information is configured to be imported into a second program.

Example 2. The method of example 1, wherein generating the first assembly sequence based on the assembly parameters comprises: applying an algorithm to the assembly parameters.

Example 3. The method of example 2, wherein the algorithm includes a genetic algorithm.

Example 4. The method of example 1, wherein generating the first assembly sequence based on the assembly parameters comprises: assigning, by the first processor, location information to each part of the plurality of parts.

Example 5. The method of example 4, wherein the location information for each part of the plurality of parts includes a respective part delivery structure identifier corresponding to a respective part delivery structure associated with the robotic cell configuration on which the respective part is to be positioned before assembly.

Example 6. The method of example 5, wherein the part delivery structure is a table.

Example 7. The method of example 5, wherein the location information for each part of the plurality of parts includes respective part delivery structure location information indicative of where the respective part is to be positioned on the respective part delivery structure before assembly.

Example 8. The method of example 1, wherein the geometry information for each part includes joint information and robot engagement feature information.

Example 9. The method of example 1, wherein the geometry information is three-dimensional.

Example 10. The method of example 1, wherein the geometry information is derived from a three-dimensional model defined in a three-dimensional rendering program file.

Example 11. The method of example 1, wherein the first robot utilization information identifies how many of the robots among the plurality of robots of the robotic cell configuration are utilized by the first assembly sequence, and wherein the first cycle time information identifies a first cycle time corresponding to the robotic cell configuration for the first assembly sequence and/or the first assembly accuracy information identifies a first assembly accuracy corresponding to the assembly for the first assembly sequence.

Example 12. The method of example 1, further comprising: performing, by the first processor, a simulation based on the robotic cell configuration for the first assembly sequence to generate the first simulation performance information for the first assembly sequence.

Example 13. The method of example 1, further comprising: causing, by the first processor, the first program information to be imported into the first program; and causing, by the first processor, the second program information to be imported into the second program.

Example 14. The method of example 13, wherein: causing the first program information to be imported into the first program comprises importing the first program information into the first program; and causing the second program information to be imported into the second program comprises importing the second program information into the second program.

Example 15. The method of example 1, wherein the first program is a first robot program configured to be executed by a first robot of the plurality of robots associated with the robotic cell configuration, wherein the second program is configured to be executed by a second processor, and wherein the second processor is configured to communicate with one or more of the plurality of robots associated with the robotic cell configuration.

Example 16. The method of example 15, wherein the second processor is a programmable logic controller (PLC) and the second program is a PLC program.

Example 17. The method of example 15, wherein the one or more of the plurality of robots includes the first robot.

Example 18. The method of example 1, wherein the first program is a first robot program configured to be executed by a first robot of the plurality of robots associated with the robotic cell configuration, wherein the second program is configured to be executed by a second processor, and wherein the second processor is configured to communicate with a plurality of components associated with the robotic cell configuration.

Example 19. The method of example 18, wherein the plurality of components includes one or more of the plurality of robots.

Example 20. The method of example 19, wherein the one or more of the plurality of robots includes the first robot.

Example 21. The method of example 18, wherein the second processor is a programmable logic controller (PLC) and the second program is a PLC program.

Example 22. The method of example 1, further comprising: determining, by the first processor, the first score for the first assembly sequence based on the first simulation performance information for the first assembly sequence; and comparing, by the first processor, the first score with a second score, and wherein selecting the first assembly sequence based on the first score corresponding to the first assembly sequence comprises selecting the first assembly sequence based on the comparison of the first score with the second score.

Example 23. The method of example 22, wherein the second score is a default value.

Example 24. The method of example 23, further comprising: generating, by the first processor, a plurality of assembly sequences, wherein the plurality of assembly sequences includes the first assembly sequence, and wherein each respective assembly sequence of the plurality of assembly sequences defines a respective order in which the plurality of parts is to be joined to form the assembly; determining, by the first processor, a respective score for each assembly sequence of the plurality of assembly sequences, wherein the first score is the respective score for the first assembly sequence, and wherein the default value is not one of the respective scores determined for the plurality of assembly sequences.

Example 25. The method of example 24, wherein the default value is a numerical value and the respective scores determined for the plurality of assembly sequences are numerical values.

Example 26. The method of example 24, wherein each respective score for each assembly sequence of the plurality of assembly sequences is determined based on respective simulation performance information associated with the robotic cell configuration generated for each respective assembly sequence of the plurality of assembly sequences.

Example 27. The method of example 22, wherein the second score corresponds to a second assembly sequence for the plurality of parts.

Example 28. The method of example 27, wherein the second assembly sequence is based on the assembly parameters.

Example 29. The method of example 27, wherein the second assembly sequence defines a second order in which the plurality of parts is to be joined to form an assembly, and wherein the first order is different from the second order.

Example 30. The method of example 27, further comprising: generating, by the first processor, a plurality of assembly sequences, wherein the plurality of assembly sequences includes the first assembly sequence and the second assembly sequence, and wherein each respective assembly sequence of the plurality of assembly sequences defines a respective order in which the plurality of parts is to be joined to form the assembly; determining, by the first processor, a respective score for each assembly sequence of the plurality of assembly sequences, wherein the first score is the respective score for the first assembly sequence and the second score is the respective score for the second assembly sequence.

Example 31. The method of example 30, wherein the respective scores determined for the plurality of assembly sequences are numerical values.

Example 32. The method of example 30, wherein each respective score for each assembly sequence of the plurality of assembly sequences is determined based on respective simulation performance information associated with the robotic cell configuration generated for each respective assembly sequence of the plurality of assembly sequences.

Example 33. The method of example 22, wherein comparing the first score with the second score comprises determining whether the first score satisfies at least one criterion relative to the second score.

Example 34. The method of example 33, wherein the at least one criterion includes the first score being less than the second score, less than or equal to the second score, equal to the second score, greater than the second score, or greater than or equal to the second score.

Example 35. The method of example 33, wherein selecting the first assembly sequence based on the comparison of the first score with the second score comprises selecting the first assembly sequence based on the determination of whether the first score satisfies the at least one criterion relative to the second score.

Example 36. The method of example 35, wherein the selecting the first assembly sequence based on the determination of whether the first score satisfies the at least one criterion relative to the second score comprises selecting the first assembly sequence when the first score satisfies the at least one criterion relative to the second score.

Example 37. The method of example 35, wherein the selecting the first assembly sequence based on the determination of whether the first score satisfies the at least one criterion relative to the second score comprises selecting the first assembly sequence when the first score does not satisfy the at least one criterion relative to the second score.

Example 38. The method of example 1, further comprising: generating, by the processor, a second assembly sequence for the plurality of parts based on the assembly parameters, wherein the second assembly sequence defines a second order in which the plurality of parts is to be joined to form an assembly, wherein the first order is different from the second order; generating, by the first processor, second simulation performance information for the second assembly sequence, wherein the second simulation performance information is associated with the robotic cell configuration, and wherein the second simulation performance information includes second robot utilization information and second cycle time information corresponding to the plurality of robots and/or a second assembly accuracy information corresponding to an assembly; and wherein selecting the first assembly sequence comprises selecting the first assembly sequence from a plurality of assembly sequences, wherein the plurality of assembly sequences includes the first assembly sequence and the second assembly sequence.

Example 39. The method of example 38, wherein generating the first assembly sequence based on the assembly parameters comprises applying a first algorithm to the assembly parameters, and wherein generating the second assembly sequence based on the assembly parameters comprises applying a second algorithm to the assembly parameters.

Example 40. The method of example 39, wherein the first algorithm and the second algorithm are different.

Example 41. The method of example 39, wherein the first algorithm includes a first genetic algorithm and the second algorithm includes a second genetic algorithm.

Example 42. The method of example 38, wherein generating the first assembly sequence based on the assembly parameters comprises assigning, by the first processor, first respective location information to each part of the plurality of parts, and wherein generating the second assembly sequence based on the assembly parameters comprises assigning, by the first processor, second respective location information to each part of the plurality of parts.

Example 43. The method of example 42, wherein the first respective and second respective location information for each part of the plurality of parts includes a respective part delivery structure identifier corresponding to a respective part delivery structure associated with the robotic cell configuration on which the respective part is to be positioned before assembly.

Example 44. The method of example 43, wherein the part delivery structure is a table.

Example 45. The method of example 43, wherein the first respective and second respective location information for each part of the plurality of parts includes respective part delivery structure location information indicative of where the respective part is to be positioned on the respective part delivery structure before assembly.

Example 46. The method of example 38, wherein the geometry information for each part includes joint information and robot engagement feature information.

Example 47. The method of example 38, wherein the geometry information is three-dimensional.

Example 48. The method of example 38, wherein the geometry information is derived from a three-dimensional model defined in a three-dimensional rendering program file.

Example 49. The method of example 38, wherein robot utilization information identifies how many of the robots among the plurality of robots of the robotic cell configuration are utilized by the respective assembly sequence of the plurality of assembly sequences, and wherein cycle time information identifies a cycle time corresponding to the robotic cell configuration for the respective assembly sequence of the plurality of assembly sequences and/or the assembly accuracy information identifies an assembly accuracy corresponding to the assembly for the respective assembly sequence.

Example 50. The method of example 38, further comprising: performing, by the first processor, a respective simulation based on the robotic cell configuration for each respective assembly sequence of the plurality of assembly sequences to generate respective simulation performance information for each respective assembly sequence of the plurality of assembly sequences.

Example 51. The method of example 38, further comprising: causing, by the first processor, the first program information to be imported into the first program; and causing, by the first processor, the second program information to be imported into the second program.

Example 52. The method of example 51, wherein: causing the first program information to be imported into the first program comprises importing the first program information into the first program; and causing the second program information to be imported into the second program comprises importing the second program information into the second program.

Example 53. The method of example 38, wherein the first program is a first robot program configured to be executed by a first robot of the plurality of robots associated with the robotic cell configuration, wherein the second program is configured to be executed by a second processor, and wherein the second processor is configured to communicate with one or more of the plurality of robots associated with the robotic cell configuration.

Example 54. The method of example 53, wherein the second processor is a programmable logic controller (PLC) and the second program is a PLC program.

Example 55. The method of example 53, wherein the one or more of the plurality of robots includes the first robot.

Example 56. The method of example 38, wherein the first program is a first robot program configured to be executed by a first robot of the plurality of robots associated with the robotic cell configuration, wherein the second program is configured to be executed by a second processor, and wherein the second processor is configured to communicate with a plurality of components associated with the robotic cell configuration.

Example 57. The method of example 56, wherein the plurality of components includes one or more of the plurality of robots.

Example 58. The method of example 57, wherein the one or more of the plurality of robots includes the first robot.

Example 59. The method of example 56, wherein the second processor is a programmable logic controller (PLC) and the second program is a PLC program.

Example 60. The method of example 38, further comprising: determining, by the first processor, a respective score for each assembly sequence of the plurality of assembly sequences based on respective simulation performance information for each respective assembly sequence of the plurality of assembly sequences; and comparing, by the first processor, the scores corresponding to the plurality of assembly sequences with each other, wherein the scores corresponding to the plurality of assembly sequences includes the first score, and wherein selecting the first assembly sequence comprises selecting the first assembly sequence from the plurality of assembly sequences based on the comparison.

Example 61. The method of example 60, wherein comparing the scores corresponding to the plurality of assembly sequences with each other comprises determining which respective score from the scores is the highest or lowest score among the scores.

Example 62. The method of example 61, wherein the first score is the respective score determined to be the highest or lowest score among the scores.

Example 63. The method of example 1, wherein the first processor includes a memory, wherein the memory includes instructions stored thereon, that when executed by the first processor, cause the first processor to perform any function recited with respect to the first processor.

Example 64. The method of example 1, wherein the first processor comprises a plurality of processing components distributed across one or more networks, wherein one or more processing components of the first processor are configured to perform any function recited with respect to the first processor.

Example 65. The method of example 1, wherein the first processor comprises a single processor or multiple processors.

Example 66. The method of example 1, wherein the first processor comprises a computing system.

Example 67. The method of example 66, wherein the computing system includes one or more computing components distributed across one or more networks, wherein one or more computing components of the computing system are configured to perform any function recited with respect to the first processor.

Example 68. A method comprising one or more techniques described in this disclosure.

Example 69. A method comprising any combination of features recited by examples 1-68.

Example 70. A method comprising any combination of examples 1-69.

Example 71. Any apparatus, device, processor, or system described in this disclosure.

Example 72. A processor configured to perform one or more techniques described in this disclosure.

Example 73. A processor configured to perform any combination of features recited by examples 1-70.

Example 74. A processing system configured to perform one or more techniques described in this disclosure.

Example 75. A processing system configured to perform any combination of features recited by examples 1-70.

Example 76. A processing system comprising one or more means for performing one or more techniques described in this disclosure.

Example 77. A processing system comprising one or more means for performing the method of any of examples 1-70 or any combination of examples 1-70.

Example 78. The processing system of example 76 or 77, wherein the one or more means comprises one or more processors.

Example 79. A non-transitory computer-readable medium having code stored thereon that, when executed, causes an apparatus to: perform one or more techniques described in this disclosure.

Example 80. A non-transitory computer-readable medium having code stored thereon that, when executed, causes an apparatus to: perform the method of any of examples 1-70 or any combination of examples 1-70.

Example 81. A non-transitory computer-readable medium having code stored thereon that, when executed, causes at least one processor of an apparatus to: perform one or more techniques described in this disclosure.

Example 82. A non-transitory computer-readable medium having code stored thereon that, when executed, causes at least one processor of an apparatus to: perform the method of any of examples 1-70 or any combination of examples 1-70.

Example 83. The method of any of example 81 or 82, wherein the apparatus is a processing system.

Example 84. The method of example 83, wherein the processing system includes one or more components distributed across one or more networks.

Example 85. The method of example 84, wherein one or more components of the processing system are configured to perform any function described in this disclosure.

Example 86. An example method comprising: receiving, by a first processor, assembly parameters, wherein the assembly parameters includes part information relating to a plurality of parts, wherein the part information includes geometry information for each part of the plurality of parts; generating, by the first processor, a plurality of assembly sequences for the plurality of parts based on the assembly parameters, wherein each respective assembly sequence of the plurality of assembly sequences defines a respective order in which the plurality of parts is to be joined to form an assembly; generating, by the first processor, simulation performance information for each assembly sequence of the plurality of assembly sequences, wherein the simulation performance information is associated with a robotic cell configuration that includes a plurality of robots, and wherein the simulation performance information includes robot utilization information and cycle time information and/or assembly accuracy information; selecting a first assembly sequence from the plurality of assembly sequences based on (i) the simulation performance information corresponding to the first assembly sequence or (ii) a first score corresponding to the first assembly sequence relative to other respective scores corresponding to other assembly sequences of the plurality of assembly sequences, wherein the first score is based on the simulation performance information corresponding to the first assembly sequence; and generating, by the first processor, first program information and second program information for the first assembly sequence, wherein the first program information is configured to be imported into a first program and the second program information is configured to be imported into a second program.

Example 87. The method of example 86, wherein generating the plurality of assembly sequences based on the assembly parameters comprises: applying an algorithm to the assembly parameters.

Example 88. The method of example 87, wherein the algorithm includes a genetic algorithm.

Example 89. The method of example 1, wherein generating the plurality of assembly sequences based on the assembly parameters comprises: assigning, by the first processor, location information to each part of the plurality of parts.

Example 90. The method of example 89, wherein the location information for each part of the plurality of parts includes a respective part delivery structure identifier corresponding to a respective part delivery structure associated with the robotic cell configuration on which the respective part is to be positioned before assembly.

Example 91. The method of example 90, wherein the part delivery structure is a table.

Example 92. The method of example 90, wherein the location information for each part of the plurality of parts includes respective part delivery structure location information indicative of where the respective part is to be positioned on the respective part delivery structure before assembly.

Example 93. The method of example 86, wherein the geometry information for each part includes joint information and robot engagement feature information.

Example 94. The method of example 86, wherein the geometry information is three-dimensional.

Example 95. The method of example 86, wherein the geometry information is derived from a three-dimensional model defined in a three-dimensional rendering program file.

Example 96. The method of example 86, wherein the robot utilization information identifies how many of the robots among the plurality of robots of the robotic cell configuration are utilized by the respective assembly sequence of the plurality of assembly sequences, and wherein the cycle time information identifies a cycle time corresponding to the robotic cell configuration for the respective assembly sequence of the plurality of assembly sequences and/or the assembly accuracy information identifies an assembly accuracy corresponding to the assembly for the respective assembly sequence of the plurality of assembly sequences.

Example 97. The method of example 86, further comprising: performing, by the first processor, a simulation based on the robotic cell configuration for each assembly sequence of the plurality of assembly sequences to generate the simulation performance information for each assembly sequence of the plurality of assembly sequences.

Example 98. The method of example 86, further comprising: causing, by the first processor, the first program information to be imported into the first program; and causing, by the first processor, the second program information to be imported into the second program.

Example 99. The method of example 98, wherein: causing the first program information to be imported into the first program includes importing the first program information into the first program; and causing the second program information to be imported into the second program includes importing the second program information into the second program.

Example 100. The method of example 86, wherein the first program is a first robot program configured to be executed by a first robot of the plurality of robots associated with the simulation performance information, wherein the second program is configured to be executed by a second processor, and wherein the second processor is configured to communicate with the plurality of robots associated with the simulation performance information.

Example 101. The method of example 100, wherein the second processor is a programmable logic controller (PLC) and the second program is a PLC program.

Example 102. The method of example 86, further comprising: determining, by the first processor, a respective score for each assembly sequence of the plurality of assembly sequences based on the respective simulation performance information for each respective assembly sequence of the plurality of assembly sequences; and comparing, by the first processor, the scores corresponding to the plurality of assembly sequences, wherein the scores corresponding to the plurality of assembly sequences includes the first score, and wherein selecting the first assembly sequence of the plurality of assembly sequences based on the first score corresponding to the first assembly sequence relative to other respective scores corresponding to other assembly sequences of the plurality of assembly sequences comprises selecting the first assembly sequence of the plurality of assembly sequences based on the comparison of the scores corresponding to the plurality of assembly sequences.

Example 103. The method of example 86, wherein the first processor includes a memory, wherein the memory includes instructions stored thereon, that when executed by the first processor, cause the first processor to perform any function recited with respect to the first processor.

Example 104. The method of example 86, wherein the first processor comprises a plurality of processing components distributed across one or more networks, wherein one or more processing components of the first processor may perform any function recited with respect to the first processor.

Example 105. The method of example 86, wherein the first processor comprises a single processor or multiple processors.

Example 106. The method of example 86, wherein the first processor comprises a computing system.

Example 107. The method of example 106, wherein the computing system has one or more computing components distributed across one or more networks, wherein one or more computing components of the computing system may perform any function recited with respect to the first processor.

Example Implementation: In some examples, a user of assembly system 100 may create a new assembly sequence simulation by selecting, using one or more input devices 140, a robot cell layout and uploading the parts to assembly. This may include building the joint connectivity matrix, and sub-assembly tree grouping for the parts. The user may adjust any robotic timing parameters used in the assembly sequence simulation, and optionally can begin seeding the tables with parts as an initial first guess. To start running the optimizer (e.g., the assembly sequence planner 102), the user sets some optimizer specific parameters and submits the job. As the optimizer finds new candidate solutions based on fitness score, the results may be stored in the database record for the simulation and be displayed for analysis. The user can analyze one or more candidates generated by the optimizer, such as all of the candidates or one or more selected candidates.

Example Optimizer Parallelization: The optimization strategy may include running the sequence simulation for a plurality of independent candidate table assignments. This can be exploited by running the sequence simulation for each candidate, such as in parallel. A master-slave parallelization architecture may be utilized. The master node may run the optimizer and create all the candidates. It may then dispatch (N/P) candidates to each slave node, where N is the number of current candidates and P is the number of slave nodes. The slave nodes may run the sequence simulator for each candidate, collect the results including the fitness score, and return the results to the master node. After all slave nodes have finished and reported back the results, the master may use all the results to determine the next set of candidates. This is an example of an iterative process which may continue until termination criteria is satisfied.

The various techniques described herein may be performed by any suitable means capable of performing the operations, such as various hardware and/or software component(s). A hardware component may include circuitry configured to perform one or more techniques described herein.

The methods disclosed herein comprise one or more steps or actions for achieving the described method. The method steps and/or actions may be interchanged with one another without departing from the scope of the claims. In other words, unless a specific order of steps or actions is explicitly specified as being required, the order and/or use of specific steps and/or actions may be modified without departing from the scope of the claims.

Various aspects of systems, apparatuses, computer program products, and methods are described more fully with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein, one skilled in the art should appreciate that the scope of this disclosure is intended to cover any aspect and any combination of aspects of the systems, apparatuses, computer program products, and methods disclosed herein. In addition, the scope of the disclosure is not limited to the structure or functionality disclosed herein. Any aspect disclosed herein may be embodied by one or more elements of a claim.

Although particular aspects are described herein, many variations and permutations of these aspects fall within the scope of this disclosure. Although some potential benefits and advantages of aspects of this disclosure may be mentioned, the scope of this disclosure is not limited to particular benefits, advantages, uses, or objectives. Rather, aspects of this disclosure are intended to be broadly applicable to any system, apparatus, computer program product, and method that may employ one or more aspects of this disclosure.

Several aspects are disclosed herein and are described and illustrated by various systems, blocks, components, functions, processes, algorithms, etc. (collectively referred to as "components"). For example, each block in FIG. 1 may constitute a component. Components of this disclosure may be implemented using or otherwise include hardware, software, or any combination thereof configured to perform one or more aspects described with respect to the component. Whether such components are implemented as hardware or software may depend upon the particular application and design constraints imposed on the overall system. Components may be separate components or sub-components of a single component. By way of example, a component, any portion of a component, or any combination of components may be implemented as a "processing system" that includes one or more processors (which may also be referred to as processing units). Examples of processors may include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, programmable logic controllers (PLCs), gated logic, discrete hardware circuits, and other suitable hardware, configured to perform the various functionality described throughout this disclosure. The one or more processors of a processing system may be communicatively coupled in accordance with the techniques described herein. Any functional aspect disclosed herein may be performed by one or more components disclosed herein. The functionality performed by one or more components may be combined into a single component. For example, assembly sequence planner 102 and memory 120 may be implemented in a single processor or multiple processing systems. As another example, various aspects of assembly sequence planner 102 and memory 120 may be spread across multiple communicatively coupled processing systems, where each processing system may include one or more processors.

One or more processors, such as one or more processors of a processing system, may be configured to execute software stored on one or more memories communicatively coupled with the one or more processors. As an example, a processor may access software stored on a memory and execute the software accessed from the memory to perform one or more techniques described herein. Software may refer to instructions, code, etc.

Functionality described herein may be embodied or encoded as hardware, software, or any combination thereof. For example, if implemented in software, a function may be stored on or encoded as one or more instructions or code on a computer-readable medium. Computer-readable media includes computer storage media. Storage media may be any available media/memory that can be accessed by processor, such as random-access memory (RAM), read-only memory (ROM), electrically erasable programmable ROM (EEPROM), optical disk storage, magnetic disk storage, other magnetic storage devices, any other medium that may be used to store software, and any combination thereof. Computer-reasonable media may be non-transitory computer readable media.

Any component herein may be configured to communicate with one or more other components. Communication may include the transmission and/or reception of information. The information may be carried in one or more messages. As an example, a first component in communication with a second component may be described as being communicatively coupled to or otherwise with the second component. For example, assembly sequence planner 102 may be communicatively coupled with one or more components of robotic cell 130. As another example, assembly sequence planner 102 may be communicatively coupled with memory 120. As another example, one or more components of assembly sequence planner 102 may be communicatively coupled with one or more other components of assembly sequence planner 102. As another example, one or more components of robotic cell 130 may be communicatively coupled with one or more other components of robotic cell 130. As another example, any component described herein configured to perform one or more techniques of this disclosure may be communicatively coupled to one or more other components configured to perform one or more techniques of this disclosure. In some examples, when communicatively coupled, two components may be actively transmitting or receiving information, or may be configured to transmit or receive information. If not communicatively coupled, any two components may be configured to communicatively couple with each other, such as in accordance with one or more communication protocols compliant with one or more communication standards. Reference to "any two components" does not mean that only two devices may be configured to communicatively couple with each other; rather, any two devices is inclusive of more than two devices. For example, a first component may communicatively couple with a second component and the first component may communicatively couple with a third component.

In some examples, the term "communicatively coupled" may refer to a communication connection, which may be direct or indirect. A communication connection may be wired, wireless, or a combination thereof. A wired connection may refer to a conductive path, a trace, or a physical medium (excluding wireless physical mediums) over which information may be communicated. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. Two components that are communicatively coupled may communicate with each other over one or more different types of networks (e.g., a wireless network and/or a wired network) in accordance with one or more communication protocols. In some examples, a communication connection may enable the transmission and/or receipt of information. For example, a first component communicatively coupled to a second component may be configured to transmit information to the second component and/or receive information from the second component in accordance with the techniques of this disclosure. Similarly, the second component in this example may be configured to transmit information to the first component and/or receive information from the first component in accordance with the techniques of this disclosure. The term "communicatively coupled" may refer to a temporary, intermittent, or permanent communication connection.

As described herein, a processing system may refer to any combination of any number (one or more more) of components configured to perform one or more techniques described herein. A processing system may include one or more devices on which one or more components of the processing system reside, such as a server, base station, user equipment, client device, station, access point, a computer, an end product, apparatus, smart phone, or system configured to perform one or more techniques described herein.

The claims are not limited to the precise configuration and components illustrated herein. Various modifications, changes and variations may be made in the arrangement, operation and details of the methods and apparatus described above without departing from the scope of the claims. Combinations such as "at least one of A, B, or C"; "one or more of A, B, or C"; "at least one of A, B, and C"; "one or more of A, B, and C"; and "A, B, C, or any combination thereof" include any combination of A, B, and/or C, and may include multiples of A, multiples of B, or multiples of C. Specifically, combinations such as "at least one of A, B, or C"; "one or more of A, B, or C"; "at least one of A, B, and C"; "one or more of A, B, and C"; and "A, B, C, or any combination thereof" may be A only, B only, C only, A and B, A and C, B and C, or A and B and C, where any such combinations may contain one or more member or members of A, B, or C. All structural and functional equivalents to the various aspects described throughout this disclosure that are known or later come to be known to those of ordinary skill in the art are expressly incorporated herein by reference and are intended to be encompassed by the claims.

While the foregoing is directed to aspects of the present disclosure, other and further aspects of the disclosure may be devised without departing from the basic scope thereof, and the scope thereof is determined by the claims that follow.

What is claimed is:

1. A system comprising:
   a memory; and
   a processing system communicatively coupled to the memory, wherein the processing system is configured to:
   receive assembly parameters from the memory;
   generate an assembly sequence for a plurality of parts based on the assembly parameters, wherein the assembly sequence includes an order in which the plurality of parts is to be joined by one or more robots to form an assembly;
   evaluate the assembly sequence based on dimensional accuracy information;
   select the assembly sequence based on the evaluation of the assembly sequence; and
   generate assembly program information for the selected assembly sequence, wherein the assembly program information characterizes an assembly of the selected assembly sequence.

2. The system of claim 1, wherein to generate the assembly sequence based on the assembly parameters, the processing system is configured to apply an algorithm to the assembly parameters.

3. The system of claim 2, wherein the algorithm includes at least a genetic algorithm, a mixed integer linear algorithm, or a satisfiability modulo theories algorithm.

4. The system of claim 1, wherein to generate the assembly sequence based on the assembly parameters, the processing system is configured to assign location information to each part of the plurality of parts.

5. The system of claim 4, wherein the location information for each part of the plurality of parts includes a respective part table identifier corresponding to a respective part table on which the respective part is to be positioned before assembly.

6. The system of claim 5, wherein the location information for each part of the plurality of parts includes respective part table location information indicative of where the respective part is to be positioned on the respective part table before assembly.

7. The system of claim 1, further comprising:
robot utilization information, wherein the robot utilization information identifies how many of the one or more robots are utilized by the assembly sequence.

8. The system of claim 1, wherein the processing system is configured to:
perform a simulation based on a robotic cell configuration for the assembly sequence to generate simulation performance information for the assembly sequence.

9. The system of claim 1, further comprising:
a computer-executable program configured to import the assembly program information and to control a robotic cell to assemble the plurality of parts based on the assembly program information, wherein the robotic cell includes the one or more robots.

10. The system of claim 9, wherein the computer-executable program includes a programmable logic controller (PLC).

11. The system of claim 1, wherein the processing system is configured to:
generate an additional assembly sequence for the plurality of parts based on the assembly parameters, wherein the additional assembly sequence includes an additional order in which the plurality of parts is to be joined to form an assembly, and
generate simulation performance information for the assembly sequence and the additional assembly sequence, wherein generating the simulation performance information includes determining a first score for the assembly sequence and a second score for the additional assembly sequence, and selecting the assembly sequence includes comparing the first and second scores.

12. The system of claim 11, wherein the first and second scores are determined based on respective simulation performance information associated with a robotic cell configuration generated for each of the assembly sequence and the additional assembly sequence.

13. The system of claim 11, wherein the order is different from the additional order.

14. The system of claim 11, wherein comparing the first score with the second score includes determining whether the first score satisfies at least one criterion relative to the second score.

15. The system of claim 14, wherein the at least one criterion includes the first score being less than the second score, less than or equal to the second score, equal to the second score, greater than the second score, or greater than or equal to the second score.

16. The system of claim 1, wherein the processing system comprises a plurality of processing components distributed across one or more networks.

17. The system of claim 1, wherein the processing system comprises a single processor or multiple processors.

18. The system of claim 1, wherein the processing system comprises a computing system.

19. The system of claim 18, wherein the computing system includes one or more computing components distributed across one or more networks.

20. The system of claim 1, further comprising implementing an optimization routine configured to generate a plurality of assembly sequences for the plurality of parts in a search space, evaluate each sequence, and then use the sequence with a best evaluation to generate one or more new assembly sequences.

21. The system of claim 1, wherein the dimensional accuracy information is based on a final assembly of the assembly.

22. The system of claim 1, wherein the dimensional accuracy information includes at least a predicted length measurement of the assembly or a predicted rotation measurement of the assembly.

23. The system of claim 1, further comprising a simulation performance information processor, wherein the simulation performance information processor is configured to compare an assembly accuracy criterion to the dimensional accuracy information to determine whether the assembly sequence should be accepted or discarded.

24. The system of claim 1, wherein the assembly sequence includes resource allocation and task schedule information.

25. The system of claim 1, wherein the assembly sequence is generated by a computer code.

26. The system of claim 25, wherein the computer code is configured to provide for placement of the plurality of parts on one or more part tables.

27. The system of claim 1, wherein the assembly parameters include part information relating to the plurality of parts.

28. The system of claim 27, wherein the part information includes geometry information for each part of the plurality of parts.

29. The system of claim 28, wherein the geometry information for each part includes joint information and robot engagement feature information.

30. The system of claim 29, wherein the robot engagement feature information comprises a robot engagement feature configured to enable a robot of the one or more robots to apply adhesive to at least one part of the plurality of parts.

31. The system of claim 28, wherein the geometry information is derived from a three-dimensional model defined in a three-dimensional rendering program file.

32. The system of claim 1, further comprising an assembly sequence generator configured to assign information to each part of the plurality of parts for at least the assembly sequence.

33. The system of claim 32, wherein the assigned information is part delivery location information.

34. The system of claim 1, further comprising a simulator configured to determine whether a part table of has one or more parts of the plurality of parts available for engagement by a robot of the one or more robots.

35. The system of claim 34, wherein when the simulator determines the part table has the one or more parts available for engagement by the robot, the simulator is configured to cause the robot to engage the one or more parts.

36. The system of claim 1, further comprising a simulator configured to determine if a robot of the one or more robots needs an end effector from a plurality of end effectors to engage a part of the plurality of parts.

37. The system of claim 36, wherein when the simulator determines the robot needs the end effector to engage the part, the simulator is configured to cause the robot to equip the end effector with the part.

38. A non-transitory computer-readable medium storing computer readable instructions, which when executed by at least one processor, causes the at least one processor to:
receive assembly parameters;
generate an assembly sequence for a plurality of parts based on the assembly parameters, wherein the assembly sequence includes an order in which the plurality of parts is to be joined by one or more robots to form an assembly;
evaluate the assembly sequence based on dimensional accuracy information;
select the assembly sequence based on the evaluation of the assembly sequence; and
generate assembly program information for the selected assembly sequence, wherein the assembly program information characterizes an assembly of the selected assembly sequence.

39. A non-transitory computer-readable medium storing computer readable instructions, which when executed by at least one processor, causes the at least one processor to:
receive assembly parameters;
generate an assembly sequence for a plurality of parts based on the assembly parameters, wherein the assembly sequence includes a placement of the plurality of parts on one or more part tables and wherein the assembly sequence includes an order in which the plurality of parts is to be joined by one or more robots to form an assembly;
evaluate the assembly sequence based on dimensional accuracy information;
select the assembly sequence based on the evaluation of the assembly sequence; and
generate assembly program information for the selected assembly sequence, wherein the assembly program information characterizes an assembly of the selected assembly sequence.

40. A system comprising:
a memory storing instructions; and
a processing system communicatively coupled to the memory, wherein the processing system is configured to execute the instructions to:
receive assembly parameters from the memory;
generate an assembly sequence for a plurality of parts based on the assembly parameters, wherein the assembly sequence includes a placement of the plurality of parts on one or more part tables and wherein the assembly sequence includes an order in which the plurality of parts is to be joined by one or more robots to form an assembly;
evaluate the assembly sequence based on dimensional accuracy information;
select the assembly sequence based on the evaluation of the assembly sequence; and
generate assembly program information for the selected assembly sequence, wherein the assembly program information characterizes an assembly of the selected assembly sequence.

41. The system of claim 40, further comprising implementing an optimization routine configured to generate a plurality of assembly sequences for the plurality of parts in a search space, evaluate each sequence, and then use the sequence with a best evaluation to generate one or more new assembly sequences.

42. The system of claim 40, wherein the assembly sequence includes resource allocation and task schedule information.

43. The system of claim 40, wherein the processing system is configured to:
perform a simulation based on a robotic cell configuration for the assembly sequence to generate simulation performance information for the assembly sequence.

44. The system of claim 40, wherein the processing system includes a plurality of processing components distributed across one or more networks.

45. The system of claim 40, wherein the processing system includes a single processor or multiple processors.

46. The system of claim 40, wherein the assembly sequence is generated by a computer code.

47. The system of claim 46, wherein the computer code is configured to provide for placement of the plurality of parts on the one or more part tables.

48. The system of claim 40, wherein the assembly parameters include part information relating to the plurality of parts.

49. The system of claim 48, wherein the part information includes geometry information for each part of the plurality of parts.

50. The system of claim 49, wherein the geometry information is derived from a three-dimensional model defined in a three-dimensional rendering program file.

51. The system of claim 49, wherein the geometry information for each part includes joint information and robot engagement feature information.

52. The system of claim 51, wherein the robot engagement feature information includes a robot engagement feature configured to enable a robot of the one or more robots to apply adhesive to at least one part of the plurality of parts.

53. The system of claim 40, further comprising an assembly sequence generator configured to assign information to each part of the plurality of parts for at least the assembly sequence.

54. The system of claim 53, wherein the assigned information is part delivery location information.

55. The system of claim 40, further comprising a simulator configured to determine whether a part table of the one or more part tables has one or more parts of the plurality of parts available for engagement by a robot of the one or more robots.

56. The system of claim 55, wherein when the simulator determines the part table has the one or more parts available for engagement by the robot, the simulator is configured to cause the robot to engage the one or more parts.

57. The system of claim 40, further comprising a simulator configured to determine if a robot of the one or more robots needs an end effector from a plurality of end effectors to engage a part of the plurality of parts.

58. The system of claim 57, wherein when the simulator determines the robot needs the end effector to engage the part, the simulator is configured to cause the robot to equip the end effector with the part.

59. The system of claim 40, wherein the processing system is configured to apply an algorithm to the assembly parameters.

60. The system of claim 59, wherein the algorithm includes at least a genetic algorithm, a mixed integer linear algorithm, or a satisfiability modulo theories algorithm.

61. The system of claim 40, wherein the processing system is configured to assign location information to each part of the plurality of parts.

62. The system of claim 61, wherein the location information for each part of the plurality of parts includes a respective part table identifier corresponding to a respective part table on which the respective part is to be positioned before assembly.

63. The system of claim 62, wherein the location information for each part of the plurality of parts includes respective part table location information indicative of where the respective part is to be positioned on the respective part table before assembly.

64. The system of claim 40, wherein the processing system includes a computing system.

65. The system of claim 64, wherein the computing system includes one or more computing components distributed across one or more networks.

66. The system of claim 40, further comprising:
generate simulation performance information for the assembly sequence, wherein the evaluation of the assembly sequence is based on the simulation performance information.

67. The system of claim 66, wherein the simulation performance information is associated with a robotic cell configuration that includes the one or more robots.

68. The system of claim 67, wherein the simulation performance information includes robot utilization information and assembly accuracy information corresponding to the assembly.

69. The system of claim 68, wherein the robot utilization information identifies how many of the one or more robots are utilized by the assembly sequence, and wherein the assembly accuracy information identifies an assembly accuracy corresponding to the assembly for the assembly sequence.

70. The system of claim 68, further comprising a simulation performance information processor, wherein the simulation performance information processor is configured to compare an assembly accuracy criterion to the assembly accuracy information to determine whether the assembly sequence should be accepted or discarded.

71. The system of claim 68, wherein the assembly accuracy information includes the dimensional accuracy information.

72. The system of claim 40, wherein the dimensional accuracy information is based on a final assembly of the assembly.

73. The system of claim 40, wherein the dimensional accuracy information includes at least a predicted length measurement of the assembly or a predicted rotation measurement of the assembly.

74. The system of claim 40, further comprising:
a computer-executable program configured to import the assembly program information and to control a robotic cell to assemble the plurality of parts based on the assembly program information, wherein the robotic cell includes the one or more robots.

75. The system of claim 74, wherein the computer-executable program includes a programmable logic controller (PLC).

76. The system of claim 40, wherein the processing system is configured to:
generate an additional assembly sequence for the plurality of parts based on the assembly parameters, wherein the additional assembly sequence includes an additional order in which the plurality of parts is to be joined to form an assembly, and
generate simulation performance information for the assembly sequence and the additional assembly sequence, wherein generating the simulation performance information includes determining a first score for the assembly sequence and a second score for the additional assembly sequence, and selecting the assembly sequence includes comparing the first and second scores.

77. The system of claim 76, wherein the first and second scores are determined based on respective simulation performance information associated with a robotic cell configuration generated for each of the assembly sequence and the additional assembly sequence.

78. The system of claim 76, wherein the order is different from the additional order.

79. The system of claim 76, wherein comparing the first score with the second score includes determining whether the first score satisfies at least one criterion relative to the second score.

80. The system of claim 79, wherein the at least one criterion includes the first score being less than the second score, less than or equal to the second score, equal to the second score, greater than the second score, or greater than or equal to the second score.

\* \* \* \* \*